United States Patent
Liu et al.

(10) Patent No.: US 10,949,987 B2
(45) Date of Patent: Mar. 16, 2021

(54) ROBUST IMAGE REGISTRATION FOR MULTIPLE RIGID TRANSFORMED IMAGES

(71) Applicant: Mitsubishi Electric Research Laboratories, Inc., Cambridge, MA (US)

(72) Inventors: Dehong Liu, Lexington, MA (US); Hassan Mansour, Boston, MA (US); Petros Boufounos, Winchester, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 112 days.

(21) Appl. No.: 16/427,736

(22) Filed: May 31, 2019

(65) Prior Publication Data
US 2020/0380703 A1    Dec. 3, 2020

(51) Int. Cl.
| | |
|---|---|
| G06K 9/00 | (2006.01) |
| G06T 7/32 | (2017.01) |
| G06T 7/33 | (2017.01) |
| G06T 7/38 | (2017.01) |
| G06T 7/37 | (2017.01) |

(52) U.S. Cl.
CPC .......... *G06T 7/32* (2017.01); *G06T 7/33* (2017.01); *G06T 7/37* (2017.01); *G06T 7/38* (2017.01); *G06T 2207/10024* (2013.01); *G06T 2207/10036* (2013.01); *G06T 2207/10041* (2013.01); *G06T 2207/10044* (2013.01)

(58) Field of Classification Search
None
See application file for complete search history.

(56) References Cited

U.S. PATENT DOCUMENTS

| | | | | |
|---|---|---|---|---|
| 10,145,669 | B2 * | 12/2018 | Cheng | G06T 7/0014 |
| 10,547,359 | B2 * | 1/2020 | Jiao | H04B 17/12 |
| 2004/0118311 | A1 * | 6/2004 | Tokiwa | B41F 13/12 |
| | | | | 101/485 |
| 2016/0163114 | A1 * | 6/2016 | Arrigoni | G06T 19/20 |
| | | | | 345/419 |
| 2017/0193628 | A1 * | 7/2017 | Sharma | G06T 3/0056 |

* cited by examiner

Primary Examiner — Hadi Akhavannik
(74) Attorney, Agent, or Firm — Gennadiy Vinokur; James McAleenan; Hironuri Tsukamoto

(57) ABSTRACT

Systems and methods for multiple image registration of images of a scene or an object. Receiving image data, the image data includes images collected from different measurements of a single modality or multiple modalities, either at different rotation angles, horizontal shifts, or vertical shifts, of the scene or the object. Estimating registration parameters, using pairs of images, each pair of images includes a reference image and a floating image. Generating parameter matrices corresponding to registration parameters using an image registration process for all pairs of images. Decomposing each parameter matrix into a low-rank matrix of updated registration parameters and a sparse matrix corresponding to the registration parameter errors for each low-rank matrix, to obtain updated registration parameters for robust registration. Using the updated registration parameters to form a transformation matrix to register the images with at least one reference image, resulting in robust registration of the images.

19 Claims, 24 Drawing Sheets

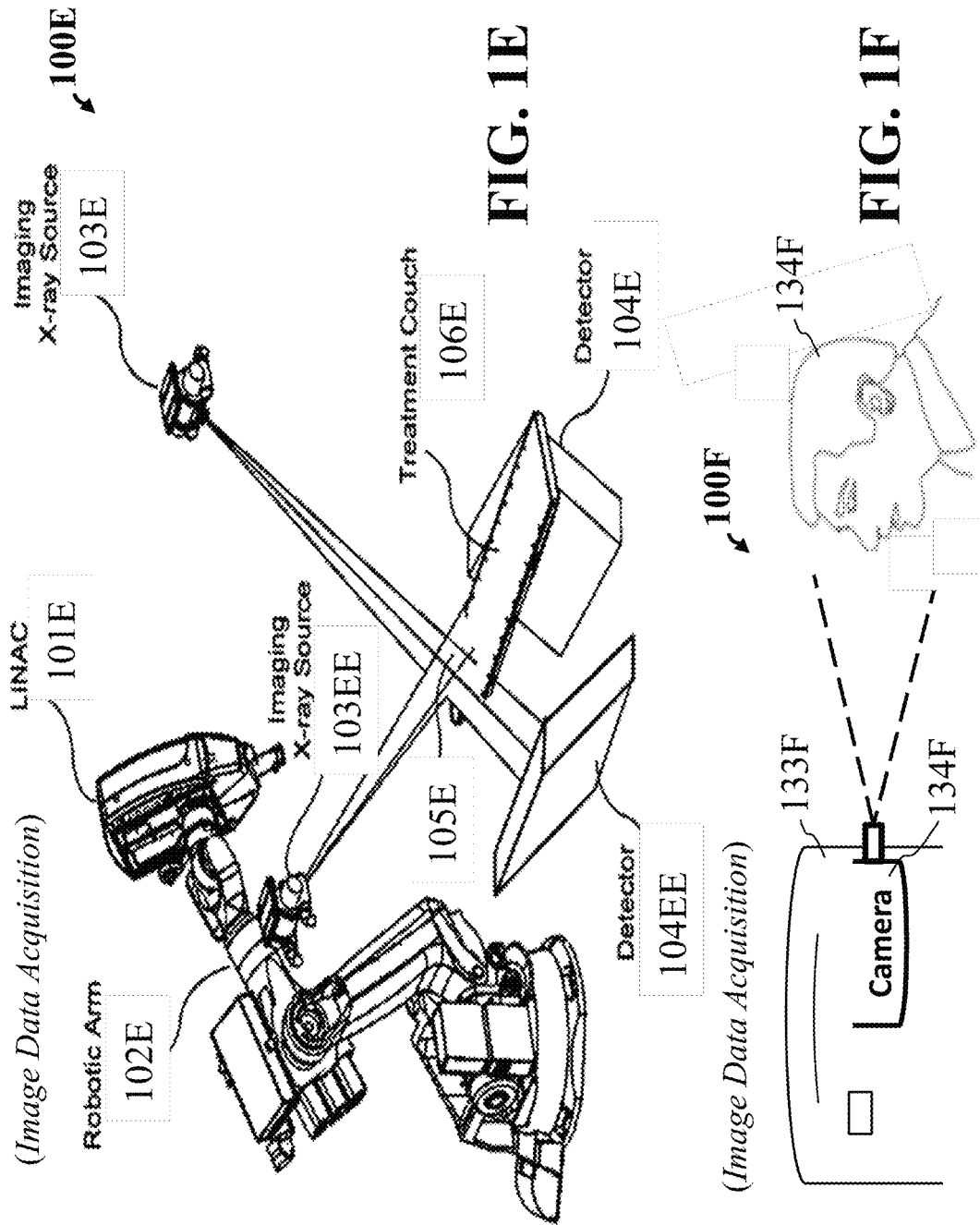

(High resolution Pan image as registration reference)

(Simulated "un-registered images", as a Mosaic of 16-band images)

(Registration parameters estimated by mutual information cause unstable image registration)

(Registered images using MI-based & sparsity-driven post process)

ROBUST IMAGE REGISTRATION FOR MULTIPLE RIGID TRANSFORMED IMAGES

FIELD

The present disclosure relates generally to multi-image registration, and more particularly to a robust sparsity-driven image registration method for multiple rigid transformed images.

BACKGROUND

Image registration is of crucial importance in integrating information from images of the same area of interest. For example, pan-sharpening is a technique to fuse a high spatial-resolution panchromatic (Pan) image with its corresponding low spatial resolution RGB (i.e. red, green, blue) color image or multi-spectral (MS) image. In order to achieve good fusion performance, an accurate registration between the Pan and the RGB or MS image is required. Image registration is an interesting developmental topic in image processing and attracts a lot of attention within the image processing technology field. For example, some conventional methods use various techniques to address some of hardware problems. For example, a method described in U.S. Pat. No. 6,173,087 B1 aims to register multi-view images by minimizing an objective function that characterizes differences between an reference image and a transformed floating image.

The present disclosure addresses the technological needs of today's image processing industries and other related technology industries, by improving the robustness of image registration for multiple rigid transformed images resulting in, by non-limiting example, enhancing image quality with high spatial resolution and high spectral resolution.

SUMMARY

The present disclosure relates to multi-image registration, and more particularly to a robust sparsity-driven image registration method for multiple image registration.

Some embodiments of the present disclosure include an improved robustness of image registration for multiple rigid transformed images by making use of registration information of pairs of images in combination with using a sparsity-driven method for robust registration. Specifically, the robust sparsity-driven image registration method for multiple image registration of the present disclosure, solves the divergence problem of image registration by exploiting the low-rank property of registration parameter matrices of all reference-floating image pairs. Wherein, these embodiments can include a first step to generate parameter matrices corresponding to registration parameters including an image rotation angle matrix, an image horizontal shift matrix and an image vertical shift matrix, using an image registration method for all pairs of images. For example, the registration method can be a mutual information (MI)-based approach, a cross-correlation process or a feature-based process, which the specific method/approach/process used, may by non-limiting example, depend upon a particular application and/or user preference.

A next step, or a second step is to decompose each parameter matrix into a low-rank matrix of inlier registration parameters and a sparse matrix corresponding to outlier parameter errors. In particular, decompose each parameter matrix into a low-rank matrix of updated registration parameters and a sparse matrix corresponding to the registration parameter errors for each low-rank matrix, to obtain updated registration parameters for robust registration. Wherein the updated registration parameters can be used to form a transformation matrix to register the images of the image data with at least one reference image, resulting in robust registration of the images.

For example, an embodiment includes a method for multiple image registration of images of a scene or an object. Images of the scene or the object are collected from different measurements of a single modality or multiple modalities, either at different rotation angles, horizontal shifts, or vertical shifts. For example, the different types of images can include multispectral (MS) images covering different narrow bands from visible bands to shortwave infra-red bands, hyperspectral images, multi-modal images (computerized tomography (CT) scan, X-ray, Magnetic resonance imaging (MRI), optical, Microwave, Radar, etc.), or single-modal but different views.

Wherein the multiple, specifically N, images with image serial number n=1, . . . , N are processed by registering image pairs, wherein each pair (i,j) of images includes a floating image i (i=1, . . . , N) and a reference image j (j=1, . . . , N). Then, using an image registration process for each pair (i,j) of images to generate three registration parameters ($\phi_{i,j}$, $x_{i,j}$, $y_{i,j}$), wherein $\phi_{i,j}$ is image rotation angle, $x_{i,j}$ is image horizontal shift, and $y_{i,j}$ is image vertical shift to register image i and image j. The image registration process can be a mutual information (MI) process, a cross-correlation process, or a feature-based process. For all image pairs (i,j), is generated three parameter matrices corresponding to registration parameters including an image rotation angle matrix $\Phi=[\phi_{i,j}]$, an image horizontal shift matrix $X=[x_{i,j}]$, and an image vertical shift matrix $Y=[y_{i,j}]$. Then, the method decomposes each parameter matrix, $\Phi$, X, or Y, into a low-rank matrix of registration parameters $\hat{\Phi}$, $\hat{X}$, or $\hat{Y}$, and a sparse matrix corresponding to the registration parameter errors for each low-rank matrix $\hat{\Phi}$, $\hat{X}$, or $\hat{Y}$, to obtain updated registration parameters for robust registration. Wherein, the updated registration parameters from low-rank matrix of registration parameters $\hat{\Phi}$, $\hat{X}$, or $\hat{Y}$ are used to register the N images with at least one reference image, which results in robust registration of the images. The above method can provide results of registering multiple images with any rigid transformations that shows significant improvements and robustness over conventional methods. Some advantages of the methods of the present disclosure include improved image sharpening, feature enhancement, and improved classification, as well as benefits in terms of range of operation, spatial and temporal characteristics, system performance, reduced ambiguity and improved reliability.

For example, the improved image registration by some methods of the present disclosure are of a crucial importance in image fusion such as pan-sharpening in the field of image registration technologies. Further, the image registration based methods of the present disclosure demonstrate effective registration of both multi-spectral (MS), multi-modal images, color images, CT & MRI images, as well as radar images. Further, the image registration based methods of the present disclosure overcome conventional image registration method problems by converging in searching registration parameters, resulting in registration, whereas the conventional image registration methods fail to converge in searching registration parameters, resulting mis-registration. For example, some conventional methods fail to register images using mutual information, where several bands totally fail to register with a Pan image due to the divergence of the optimization algorithm used by the conventional method, among other reasons.

Further, the systems and methods of the present disclosure have overcome the above conventional image processing methods, by registering images using an image registration based process with a sparsity-driven post process. The robust sparsity-driven image registration method of the present disclosure was tested and examined on registering high resolution panchromatic and low-resolution multi-spectral images under rigid transformations with random parameters. Wherein the results illustrated that the robust sparsity-driven image registration method of the present disclosure significantly improved accuracy and robustness for multiple image registration when the existing image registration methods failed to register some images correctly. Thus, one or more benefits and advantages of the systems and methods of the present disclosure is being able to overcome the problems of conventional imaging processing methods, by improving image registration, that results in high fusion performance such as reduced spectral distortion and improved spatial resolution, among other benefits.

Some benefits and advantages of the methods and systems of the present disclosure over conventional image registration methods, is providing more informative and accurate image(s) than any single source image obtained from sensors, such that the systems and methods provide all necessary information, for a user to implement image management actions. For example, an advantage of the methods and systems of the present disclosure over conventional image registration methods, is that users or machines are now able to ascertain from the robust registration of images, the required information in order to make an informed decision to conduct an image management action, wherein the conventional image registration methods fail. At least one purpose of image fusion (by-non-limiting example) is not only to reduce an amount of data, but also to construct images that are more appropriate and understandable for the human and machine perception. Also, because most of the available equipment in use within the image technology field today is not capable of providing such information, i.e. results of methods of the present disclosure, either by design or because of observational constraints. An aspect of some embodiments is that the method techniques allow the integration of different information sources, such that the robust registration image can have complementary spatial and spectral resolution characteristics. Whereas, conventional registration image techniques distort the spectral information of the multispectral data while merging, which produces blurred images or non-useable images, resulting in a user or machine not being able to ascertain from the images due to not having enough information, in order to make an image management action.

In regard to the methods of the present disclosure for the robust registration of the images, specific to objects, some benefits and advantages can include, by non-limiting example: a) provide depth clues and display accurate anatomic spacial relationships, which can be very helpful to doctors, i.e. radiologist, healthcare personnel, in planning complex surgeries or invasive treatments; b) help radiation oncologists plan and monitor cancer treatments; c) provide information on an extent and quality of blood perfusion into an cardiac muscle, while CT can delineate the course and internal structure of the arteries to the heart; d) provide information to help cardiologists assess the presence and extent of coronary artery disease; e) assist in face recognition technologies; and f) computer vision and robotics applications.

In regard to the methods of the present disclosure for the robust registration of the images, specific to scenes, some benefits and advantages can include classifying manmade materials/objects and natural materials. The methods of the present disclosure can for example, reduce a user's amount of time of manually reviewing images, and interpret all the information of the scene without further help, in order to provide valuable, actionable intelligence regarding actionable events (image management actionable events). For example, such event can include, by non-limiting example: a) identifying a location in the scene where a helicopter can land safety (with minimum risk to human life); b) used to build an urban surveillance system within an area of the scene; c) can be utilized to monitor objects and behavior within the scene; and d) industrial processes, for monitoring and fault detection and diagnosis.

According to some embodiments, some steps of the mutual information based registration includes registering a pair of images from received image data of the scene, where one image in the pair is treated as a reference image and the other image of the pair is a floating image. Further, the selecting of the pair of images from the received data of scene can be by selecting all possible pairs, or randomly selecting pairs with each image selected at least twice. Wherein, an image processor or the like, can be used for the registering of the pairs of images, via stored executable instructions accessed from a memory in communication with the image process. For example, the selecting of the reference image can be by any of the N images, and selecting the floating image can be any image other than the reference image. The pair of images can be from image data acquired from sensors approximate the scene, wherein the image data can include panchromatic (Pan) images and multi-spectral (MS) images, or multi-modal images, or single modality images captured at different time or from different viewpoints.

Upon selecting the pair of images, images are preprocess by rescaling or up sampling such that all images are in a same scale and a same coordinate system. Rigid transformation is considered between images. For example, f(s) represents an image intensity in the floating image at a position (s), and $r(T_\alpha s)$ represents an intensity at the transformed position ($T_\alpha s$) in the reference image. Such that $T_\alpha$ represents a transformation matrix with parameter ($\alpha$). The mutual information based registration process determines $\alpha$, by creating a joint image intensity histogram $h_\alpha(f, r)$ of the over-lapping volume of both images (i.e. reference image and floating image) at $\alpha$ that is computed by binning the image intensity pairs (f(s), $r(T_\alpha s)$) for all $s \in S_\alpha$, where $S\alpha$ is a set of grid pixels for which $T_\alpha s$ falls inside the domain of the reference image. Further, the joint marginal and joint image intensity distributions can be obtained by normalization of $h_\alpha(f, r)$. Further, a Powell algorithm can be used to search for an optimal registration parameter, wherein the optimal registration parameter $\alpha$ is defined as the parameter which maximizes the mutual information between the floating image f (s) and the transformed image $r(T_\alpha s)$. In regard to rigid transformations of two-dimensional (2D) images, there are three-degrees of freedom, or parameters $\phi^*$, $x^*$, and $y^*$, representing rotation angle $\phi^*$, horizontal shift $x^*$, and vertical shift $y^*$ respectively. Once the parameters are determined, image registration can be executed with image transformation.

During experimentation, some learned aspects and realizations discovered, included that image registration is very important in integrating information from images of a same area of interest that are collected from different measurements, either at different time, space, or using a different modality. Further, in order to achieve good image fusion performance with enhanced image quality such as high spatial resolution, high spectral resolution, etc., an accurate registration between images is required. Also, learned from experimentation is that a single pixel or even sub-pixel error in the registration can lead to degraded fusion performance such as significant color or spectral distortion.

Also learned from experimentation, is that in remote sensing, image fusion can be executed between images of different spectra such as Pan, MS or hyper-spectral images, of different modalities, such as radar and optical, or of different view-angles. Since the registration problem is a non-convex problem, there is no guarantee that based on our experimental single image registration method it would always succeed in searching optimal registration parameters, especially for multi-spectral or multi-modal images. Such that, for MS or multi-modal images, mutual information (MI) for the above experimental methods demonstrated to be effective in most situations. However, observed from these experiments is that the MI-based method can fail to register some MS images viewed from different angles. Further investigation showed that this mis-registration was due to the convergence characteristic of the Powell algorithm, which was used in the MI-based method to search for the optimal registration parameter.

To improve the robustness of multiple image registration, one experimental realization was to take each one of the images as a reference and try to register the other images, which is incorporated into some embodiments of the present disclosure. A robust registration plan was then further realized by combining all the registration information. Following this realization and motivated by the work of Robust Principle Component Analysis (RPCA), another realization was to propose a sparsity-driven method, which was capable of extracting parameters for robust multi-image registration. In particular, a first step included generating multiple matrices of registration parameters, where each matrix corresponded to a parameter of registration, such as rotation angle, horizontal shift, and vertical shift, etc. Each column of the parameter matrix corresponded to a reference image and each row corresponded to a floating image to be registered. Therefore, each entry of the parameter matrix corresponded to the registration parameter between the floating-reference image pair. This parameter matrix can be computed in parallel, wherein each entry of the parameter matrix is computed by a CPU. The next step was to decompose each parameter matrix into a low-rank matrix of robust registration parameters and a sparse matrix corresponding to parameter errors. In order to verify this experimental method, was by registering multi-spectral images and the panchromatic image with random rigid transformations. Learned is that the experiments demonstrated that the proposed systems and methods of the present disclosure significantly improved performance for registering multi-spectral/modality images with rigid transformations.

According to another embodiment of the present disclosure, a computer-implemented method for multiple image registration of images a scene or an object. The computer-implemented method including receiving image data of the scene or the object. The image data includes images collected from different measurements of a single modality or multiple modalities, either at different rotation angles, horizontal shifts, or vertical shifts. Estimating registration parameters, through an image processor, using pairs of images from the received image data, wherein each pair of images includes a reference image and a floating image. Generating parameter matrices corresponding to registration parameters including an image rotation angle matrix, an image horizontal shift matrix and an image vertical shift matrix, using an image registration process for all pairs of images. Decomposing each parameter matrix into a low-rank matrix of updated registration parameters and a sparse matrix corresponding to the registration parameter errors for each low-rank matrix, to obtain updated registration parameters for robust registration. Using the updated registration parameters to form a transformation matrix to register the images of the image data with at least one reference image, resulting in robust registration of the images. Wherein the following aspects below are contemplated as configuring one or a combination of modified embodiments of the above embodiment.

According to an embodiment of the present disclosure, a system for multiple image registration of images of a scene or an object. The system including a transceiver for receiving image data of the scene or the object. The image data includes images collected from different measurements of a single modality or multiple modalities, either at different rotation angles, horizontal shifts, or vertical shifts. An image processor in communication with the transceiver, is configured to estimate registration parameters, including an image rotation angle, an image horizontal shift and an image vertical shift, using pairs of images from the received image data, wherein each pair of images includes a reference image and a floating image. Generating parameter matrices corresponding to registration parameters including an image rotation angle matrix, an image horizontal shift matrix and an image vertical shift matrix, using an image registration process for all pairs of images. Decompose each parameter matrix into a low-rank matrix of updated registration parameters and a sparse matrix corresponding to the registration parameter errors for each low-rank matrix, to obtain updated registration parameters for robust registration. Use the updated registration parameters to form a transformation matrix to register the images of the image data with at least one reference image, resulting in robust registration of the images. Display the robust registered images on a display device, a user reviews the displayed robust registered images, and based upon the user's review, the user conducts an image management action.

According to another embodiment of the present disclosure, a non-transitory computer readable storage medium embodied thereon a program executable by a computer for performing a method. The method is for image processing of images of a scene or an object. The method includes acquiring image data of the scene or the object. The image data includes images collected from different measurements of a single modality or multiple modalities, either at different rotation angles, horizontal shifts, or vertical shifts. Estimating registration parameters, through the computer, using pairs of images from the acquired image data, wherein each pair of images includes a reference image and a floating image. Generating parameter matrices corresponding to registration parameters including an image rotation angle matrix, an image horizontal shift matrix and an image vertical shift matrix, using an image registration process for all pairs of images. Decomposing each parameter matrix into a low-rank matrix of updated registration parameters and a sparse matrix corresponding to the registration parameter errors for each low-rank matrix, to obtain updated registration parameters for robust registration. Using the updated registration parameters to form a transformation matrix to register the images of the image data with at least one reference image, resulting in robust registration of the images.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 1E is a schematic illustrating how another method can collect image data, i.e. X-ray images and CT images, according to some embodiments of the present disclosure;

FIG. 1F is a schematic illustrating how another method can collect image data, i.e. camera images, can include black & white images and color images, etc., according to some embodiments of the present disclosure;

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art, which fall within the scope and spirit of the principles of the presently disclosed embodiments.

DETAILED DESCRIPTION

Figure 1A:
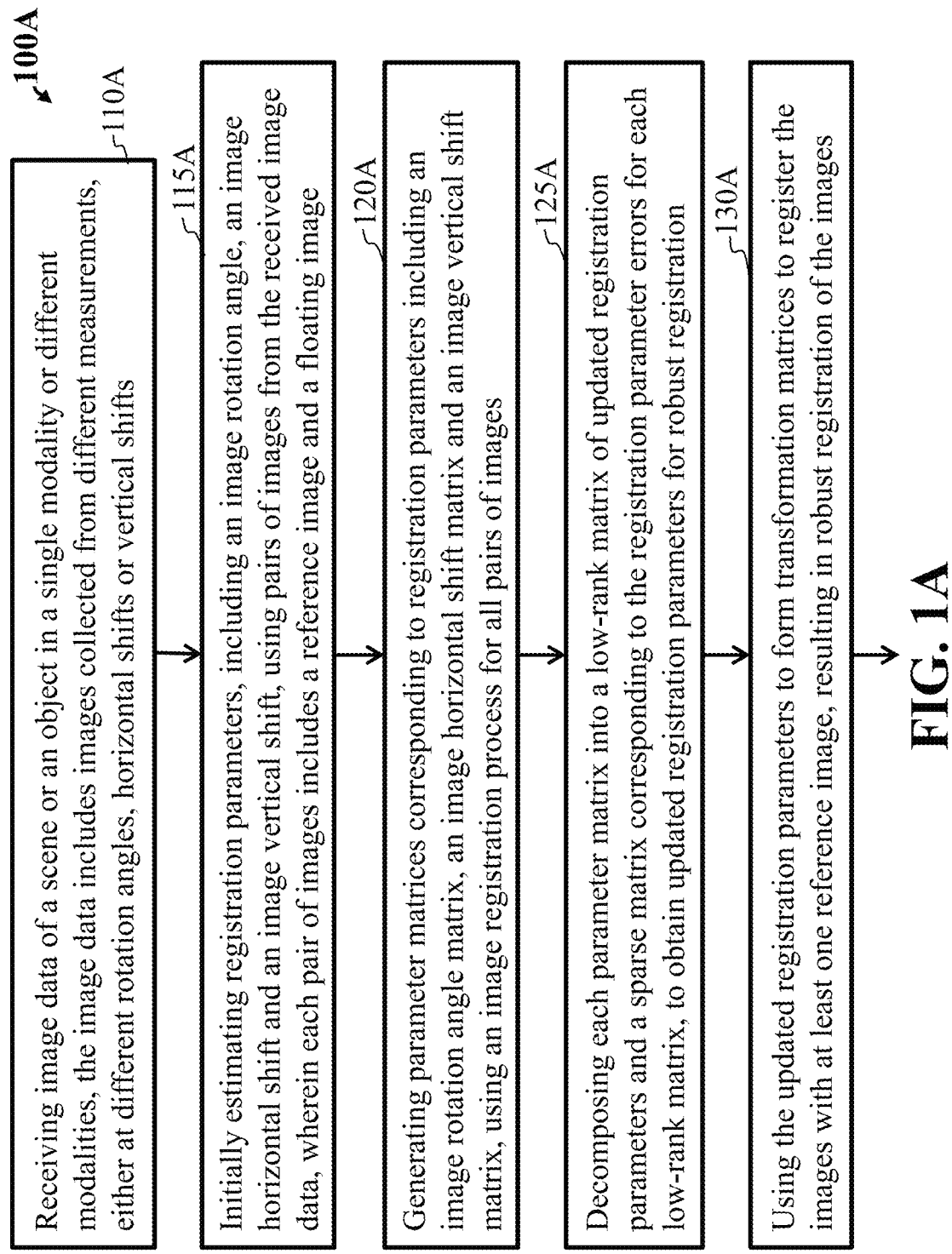
FIG. 1A is a block diagram illustrating a method for multiple image registration of images a scene or an object, according to some embodiments of the present disclosure.

FIG. 1A is a block diagram illustrating a flow chart of a method for image processing for multiple image registration of images of a scene or an object, according to embodiments of the present disclosure. Method 100A includes step 110A of receiving image data of the scene or the object, the image data includes images collected from different measurements of a single modality or multiple modalities, either at different rotation angles, horizontal shifts, or vertical shifts.

Step 115A of FIG. 1A can include initially estimating registration parameters, including an image rotation angle, an image horizontal shift and an image vertical shift, using pairs of images from the received image data, using an image registration process such as mutual information (MI)-based registration Wherein each pair of images includes a reference image and a floating image.

Step 120A of FIG. 1A can include generating parameter matrices corresponding to registration parameters including an image rotation angle matrix, an image horizontal shift matrix and an image vertical shift matrix, using the image registration process for all pairs of images.

Step 125A of FIG. 1A can include decomposing each parameter matrix into a low-rank matrix of updated registration parameters and a sparse matrix corresponding to the registration parameter errors for each low-rank matrix, to obtain updated registration parameters for robust registration.

Step 130A of FIG. 1A can include using the updated registration parameters to form a transformation matrix to register the images of the image data with at least one reference image, resulting in robust registration of the images.

Figure 1B:
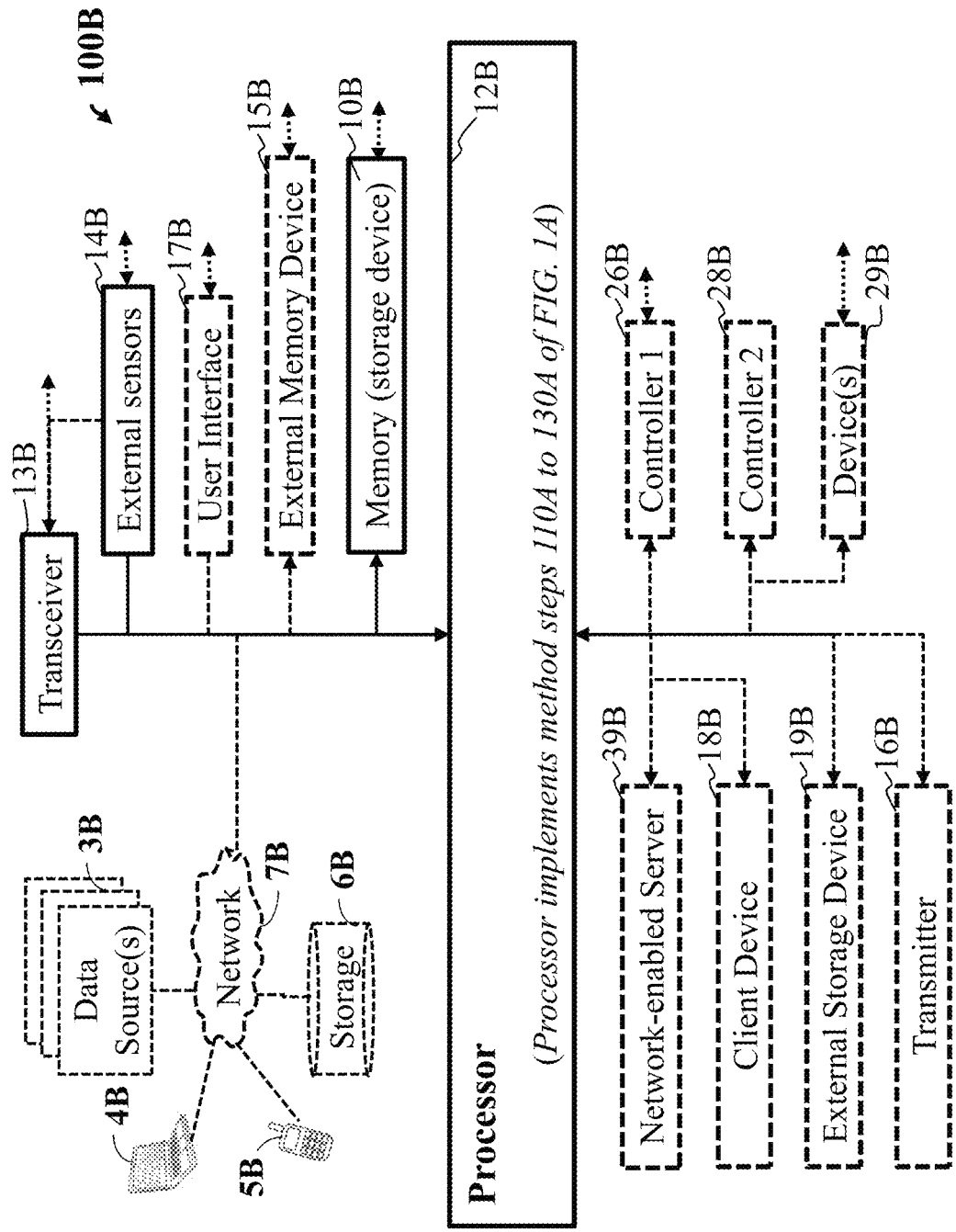
FIG. 1B is a schematic illustrating a method that includes some components that may be used for implementing some methods of the present disclosure, according to some embodiments of the present disclosure.

FIG. 1B is a schematic illustrating a method that includes some components that may be used for implementing some methods of the present disclosure, according to embodiments of the present disclosure. For example, method 100B can include the hardware processor 12B in communication with an external sensor 14B or sensors, that collects data including data such as image data. Further, the sensor 14B can generate image data that may be converted to an image signal. The hardware processor 12B is in communication with a computer storage memory, i.e. memory 10B, such that the memory 10B can include stored data, including algorithms, instructions and other data, that can be implemented by the hardware processor 12B.

Optionally, the hardware processor 12B can be connected to a network 7B, that is in communication with a data source(s) 3B, computer device 4B, a mobile phone device 5B and a storage device 6B. Also optionally, the hardware processor 12B can be connected to a network-enabled server 39B connected to a client device 18B. The hardware processor 12B can optionally be connected to an external memory device 19B, a transmitter 16B. The transceiver 13B can include capabilities as an input interface/output interface, and may receive data including image data such as unregistered images. Also the received image data can include multiple modalities of an image that can be considered to include images such as Pan, RGB, infra-red, near infrared, short-wave infrared, CT images, X-ray images, radar images, etc.

The image data can be gathered by the external sensors 14B as well as acquired by the transceiver 13B or from an external memory device 15B, or some other means of communication either wired or wireless. For example, the image data or other data can be acquired from the network 7B, which is connected Data sources 3B, computer 4B, telephone like device 5B or storage 6B. Contemplated is that the processor 12B can acquire the image data or other data directly or indirectly, e.g., a memory transfer device or a wireless communication like device (not shown). It is possible, that the user interface 17B can have a keyboard (not shown), such that upon receiving an input from a surface of the keyboard of the user interface 17B by a user, data can be obtained/received.

Still referring to FIG. 1B, the processor 12B can be in communication with the network-enabled server 39B, that can be connected to a controller (not shown) to direct the client device(s) 18B. Further, the processor 12B can be connected to a first controller 26B, and/or a second controller 28B, such that the second controller 28B can be connected to device(s) 29B. Wherein the controllers 26B, 28B can be configured to control devices associated with devices related with image processing technology, or like devices, so as to assist in implementing at least one action of some or all embodiments of the present disclosure.

Figure 1C:
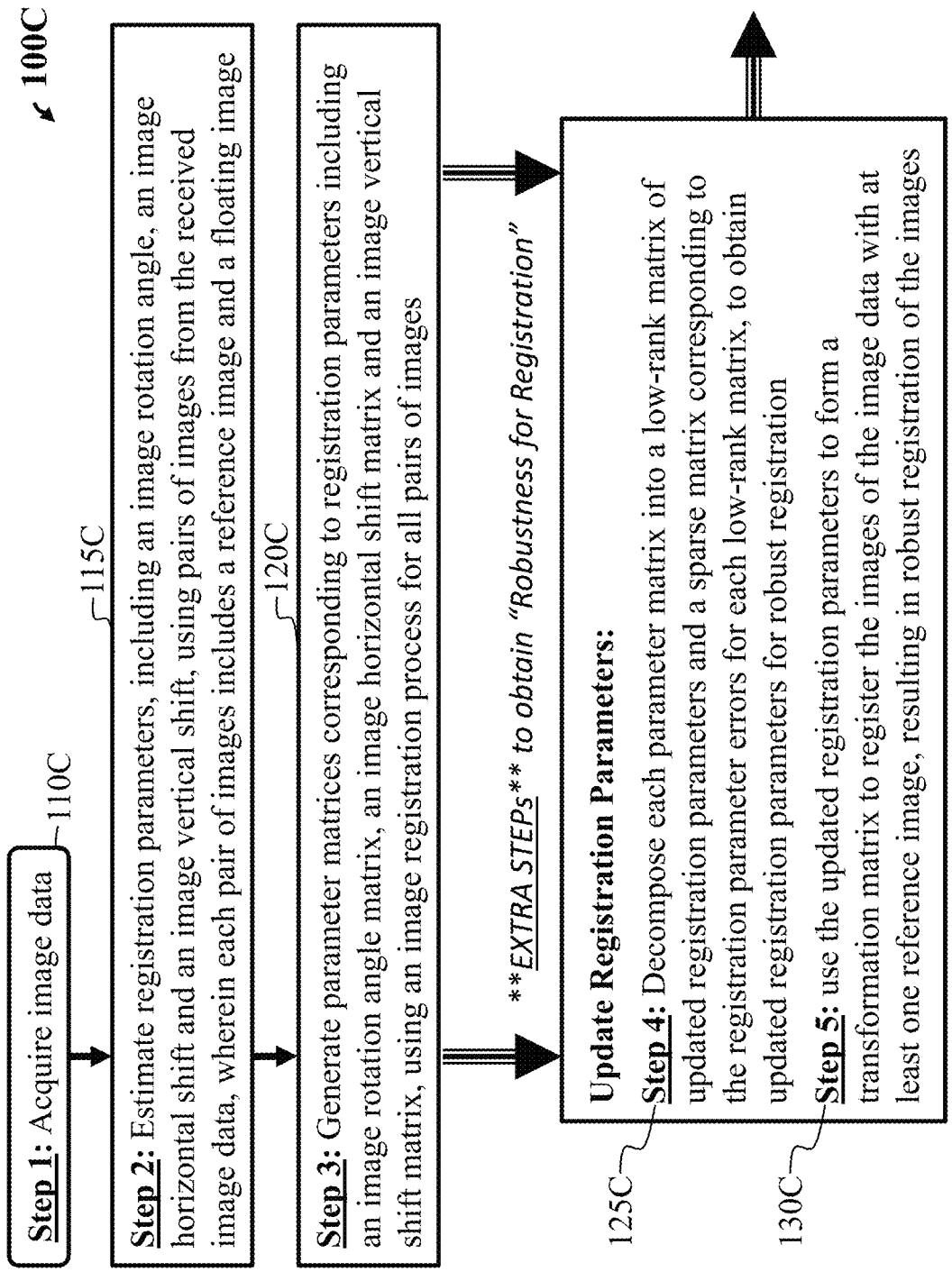
FIG. 1C is a block diagram illustrating a flow diagram of the method of FIG. 1A, according to some embodiments of the present disclosure.

FIG. 1C is a block diagram illustrating a flow diagram of the method FIG. 1A, that is for multiple image registration of images a scene or an object, according to some embodiments of the present disclosure. Method 100C includes step 1, 110C for acquiring data including image data of the scene or the object. The image data includes images collected from different measurements of a single modality or multiple modalities, either at different rotation angles, horizontal shifts, or vertical shifts. A transceiver can acquire the data and image data of the scene or the object. The image data includes images of a single modality or different modalities, collected from different measurements, at different rotation angles, horizontal shifts, or vertical shifts. Contemplated is that the data can be historical image data of the scene and/or object and other historical data.

Step 2, 115C of FIG. 1C can include can include estimating registration parameters, including an image rotation angle, an image horizontal shift and an image vertical shift, using pairs of images from the received image data, using an image registration process that can be one of a mutual information (MI) process, a cross-correlation process or a feature-based process. Wherein each pair of images includes a reference image and a floating image.

Step 3, 120C of FIG. 1C can include generating parameter matrices corresponding to registration parameters including an image rotation angle matrix, an image horizontal shift matrix and an image vertical shift matrix, using the image registration process for all pairs of images.

Step 4, 125C of FIG. 1C is a post processing step or an extra step that is used for adding robustness for registration, which can include decomposing each parameter matrix into a low-rank matrix of updated registration parameters and a sparse matrix corresponding to the registration parameter errors for each low-rank matrix, to obtain updated registration parameters for robust registration.

Step 5, 130C of FIG. 1C can include using the updated registration parameters to form a transformation matrix to register the images of the image data with at least one reference image, resulting in robust registration of the images. Further, discovered from experimentation is that the image registration based methods of the present disclosure demonstrated effective registration of both multi-spectral (MS), multi-modal images, color images, CT & MRI images, as well as radar images. Wherein the image registration based methods of the present disclosure resulted in overcoming the conventional image registration method problems by converging in searching registration parameters, which resulted in registration, whereas the conventional image registration methods failed to converge in searching registration parameters, resulting mis-registration. For example, learned from experimentation is that in order to achieve high spatial and spectral resolution images, an accurate registration between the Pan image and the multi-spectral images can be required. Realized if there is a single pixel or even sub-pixel error in the registration, then the error can lead to significant color or spectral distortion.

Still referring to FIG. 1C, contemplated is that the robust registration of the images can be displayed on a display device, wherein a user reviews the displayed robust registered images, and based upon the user's review, the user conducts an image management action that assists in providing a high fusion performance such as reduced spectral distortion and improved spatial resolution, among other benefits.

Figure 1D:
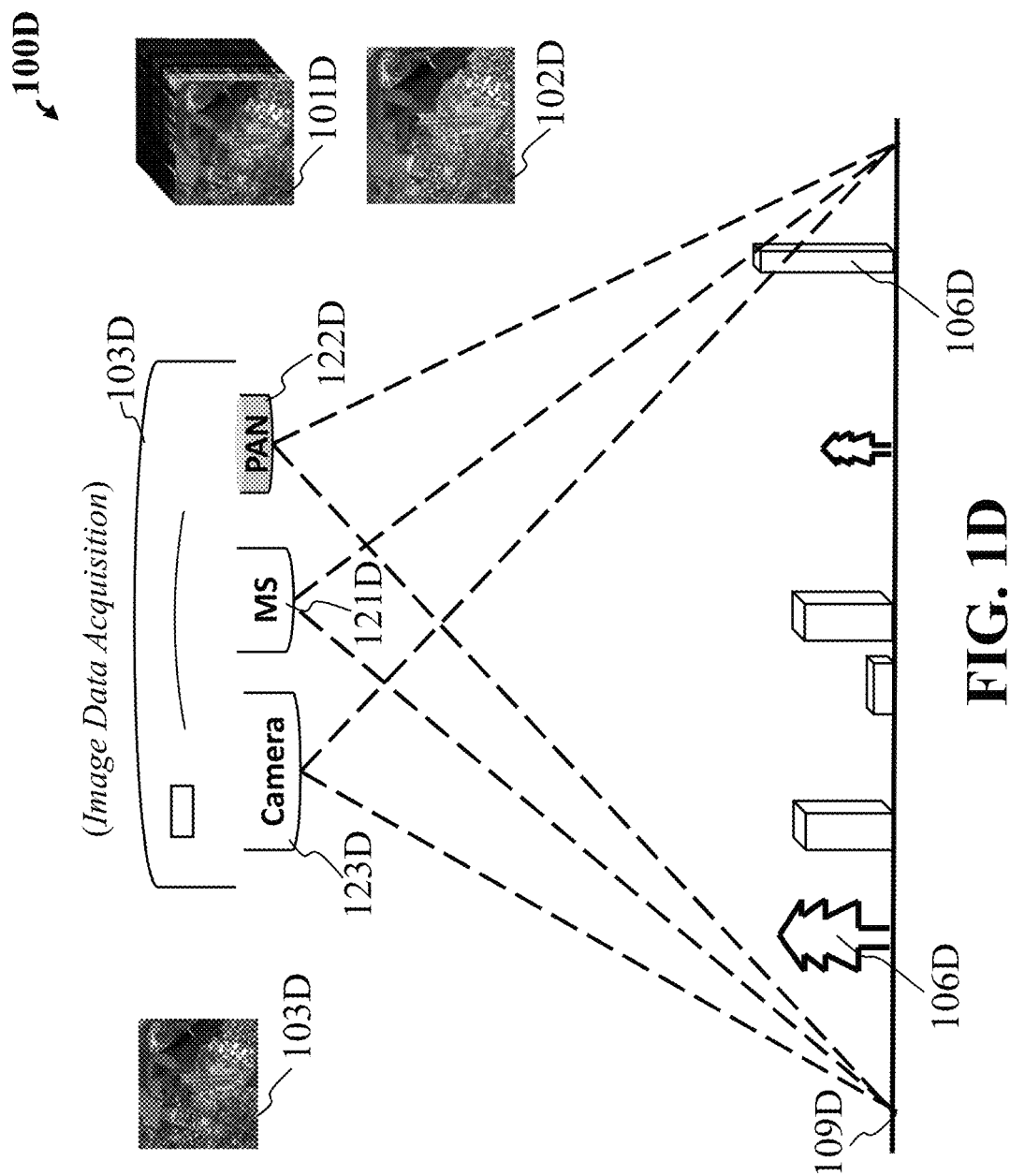
FIG. 1D is a schematic illustrating how a method can collect image data, using different modality sensors, or a single modality sensor to collect images multiple times, according to some embodiments of the present disclosure.

FIG. 1D is a schematic illustrating how a method 100D can collect data including image data from a multi-spectral (MS) image device 121D, a panchromatic (Pan) image device 122D and a camera device 123D, of the scene 109D, according to some embodiments of the present disclosure. Embodiment 100D illustrates the sensors 103D capable of multiple sensing features including capturing or collecting data over a wide frequency range beyond the optical bands, including color pictures 103D via the camera 123D, MS image data 101D via the MS device 121D, Pan data 102D via the Pan device 122D of the scene 109D. The images can be taken while the imaging device(s) is stationary or moving. Contemplated is that the imaging devices 103D could be taking pictures of one or more object(s) including a living or non-living object, metal or non-metal object, etc. Exemplary collected image data can include images collected from different measurements of a single modality or multiple modalities, either at different rotation angles, horizontal shifts, or vertical shifts, of the scene.

In regard to remote sensing, image fusion can be executed between images of different spectra such as Pan image and multispectral or hyper-spectral images, of different modalities such as radar and optical, or of different view-angles. Since the registration problem is a non-convex problem, there is no guarantee that a single image registration method will always succeed in searching optimal registration parameters, especially for multi-spectral or multi-modal images. Thus, to improve the robustness of multiple image registration, one realization included taking each one of the images as a reference and try to register the others. Wherein a robust registration plan of the present disclosure was further realized by combining all the registration information. Further, discovered is that a sparsity-driven method is capable of extracting parameters for robust multi-image registration. In particular, a first step included generating multiple matrices of registration parameters, where each matrix corresponds to a parameter of registration, such as rotation angle, horizontal shift, and vertical shift, etc. Such that, each column of the parameter matrix corresponds to a reference image and each row corresponds to a floating image to be registered. Therefore, each entry of the matrix corresponds to the registration parameter between the floating-reference image pair. Then, a next step included decomposing each parameter matrix into a low-rank matrix of robust registration parameters and a sparse matrix corresponding to parameter errors. Wherein upon testing the method(s) and system(s) by registering multi-spectral images and the panchromatic image with random rigid transformations, experiments demonstrated that the method(s) and system(s) significantly improved performance for registering multi-spectral/modality images viewed from different viewing-angles, when compared to convention image registration methods.

FIG. 1E is a schematic illustrating how another method can collect image data, i.e. X-ray images and CT images, of an object(s) living or not living, according to some embodiments of the present disclosure. Embodiment 100E illustrates the X-ray images and CT images can be collected by an imaging system that can include X-ray sources 103E and 103EE and X-ray detectors (imagers) 104E and 104EE. The two x-ray sources 103E and 103EE may be mounted in fixed positions on the ceiling of an operating room and may be aligned to project imaging x-ray beams from two different angular positions (e.g., separated by 90 degrees) to intersect at a machine center 105E (which provides a reference point for positioning the patient on a treatment couch 106E during treatment) and to illuminate imaging planes of respective detectors 104E and 104EE after passing through the patient. In other embodiments, system 100E may include more or less than two X-ray sources and more or less than two detectors, and any of the detectors may be movable rather than fixed. In yet other embodiments, the positions of the x-ray sources and the detectors may be interchanged. The detectors 104E and 104EE may be fabricated from a scintillating material that converts the X-rays to visible light (e.g., amorphous silicon), and an array of CMOS (complementary metal oxide silicon) or CCD (charge-coupled device) imaging cells that convert the light to a digital image that can be compared with the reference images during the registration process. Exemplary collected image data can include images collected from different measurements of a single modality or multiple modalities, either at different rotation angles, horizontal shifts, or vertical shifts, of the object.

FIG. 1F is a schematic illustrating how another method can collect image data, i.e. camera images, that can include black & white images and color images, etc., according to embodiments of the present disclosure. Embodiment 100F illustrates an imaging device 133F including a camera device 134F. It is contemplated more than one camera 134F can be in the imaging device 133F, or one or more different types of camera devices. Wherein the subject of the image data can include body parts of a human, such as a face, a head 135F, etc. Other subjects of the image data can include non-living objects, living objects, stationary or moving objects, etc.

Figure 2:
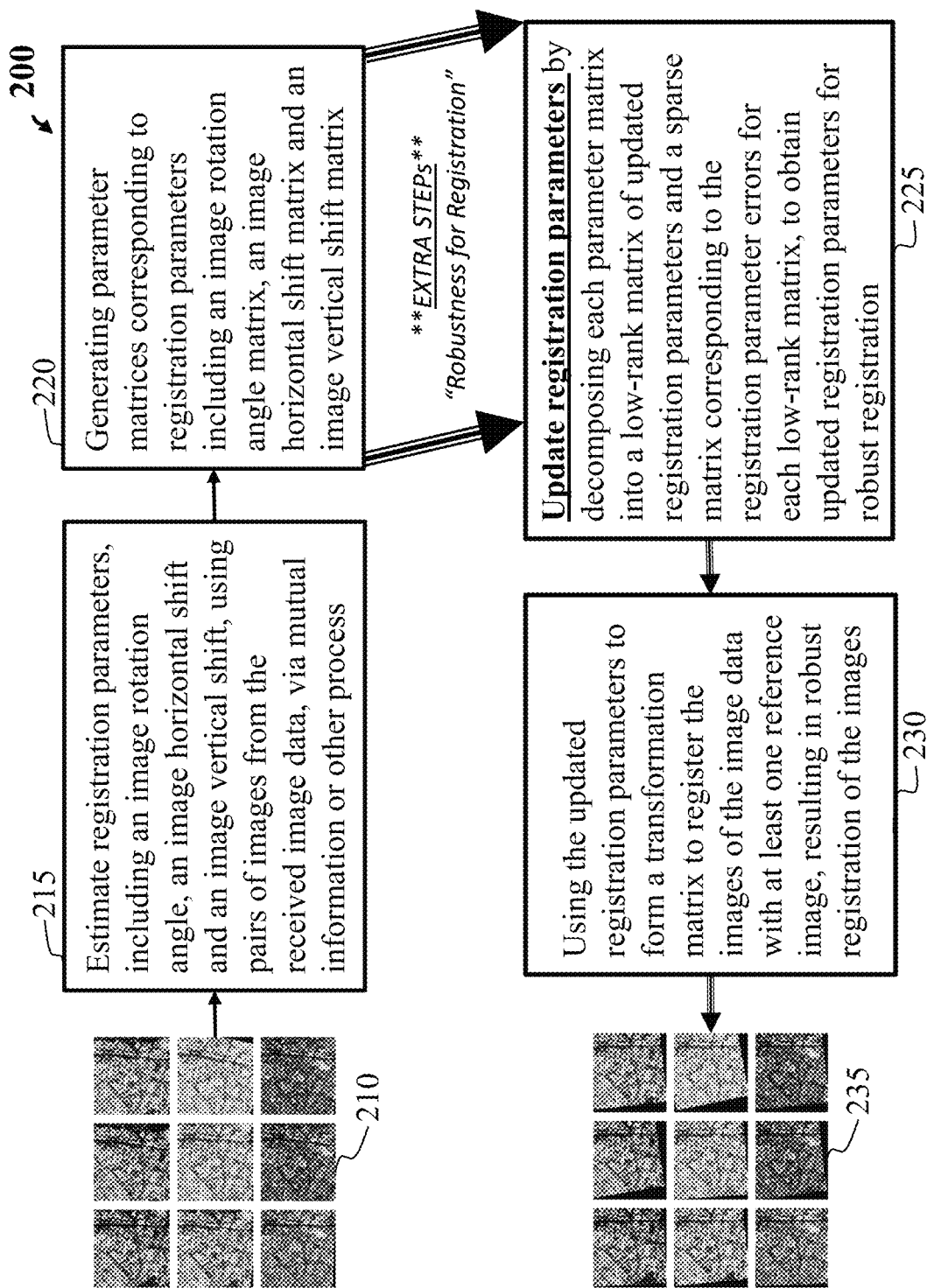
FIG. 2 is a schematic illustrating some methods receiving image data and using mutual information based registration and sparsity-driven post processing to produce images with an improved registration, according to some embodiments of the present disclosure.

FIG. 2 is a schematic illustrating some methods receiving image data and using mutual information based registration and sparsity-driven post processing to produce images with an improved registration, according to some embodiments of the present disclosure. Embodiment 200 includes receiving image data 210 of the scene or an objection. The image data 210 can include images collected from different measurements of a single modality or multiple modalities, either at different rotation angles, horizontal shifts, or vertical shifts, of the scene Step 215 of FIG. 2 can include estimating registration parameters, through an image processor, using pairs of images from the received image data, wherein each pair of images includes a reference image and a floating image.

Step 220 of FIG. 2 can include generating parameter matrices corresponding to registration parameters including an image rotation angle matrix, an image horizontal shift matrix and an image vertical shift matrix, using an image registration process for all pairs of images.

Mutual Information Based Registration

When registering two images, one image is treated as the reference and the other one as the floating image. Pixel samples of the floating image are then transformed to the reference image such that both images are in the same coordinate system. Let f(s) denote the image intensity in the floating image at position s and $r(T_\alpha s)$ the intensity at the transformed position $T_\alpha s$ in the reference image, where $T_\alpha$ represents the transformation matrix with parameter α. The mutual information based registration process determines α through the following processes.

The joint image intensity histogram $h_\alpha(f,r)$ of the overlapping volume of both images at position a is computed by binning the image intensity pairs)) (f(s), r($T_\alpha$s)) for all s∈$S_\alpha$, where $S_\alpha$ is the set of grid pixels for which $T_\alpha$s falls inside the domain of the reference image. The joint marginal and joint image intensity distributions are obtained by normalization of $h_\alpha(f,r)$:

$$p_{FR,\alpha}(f,r) = \frac{h_\alpha(f,r)}{\Sigma_{f,r} h_\alpha(f,r)}, \quad (1)$$

$$p_{F,\alpha}(f) = \sum_r p_{FR,\alpha(f,r)}, \quad (2)$$

$$p_{R,\alpha}(r) = \sum_f p_{FR,\alpha(f,r)}. \quad (3)$$

The Powell algorithm is typically utilized to search the optimal registration parameter $\alpha^*$ which maximizes the mutual information between f(s) and r($T_\alpha$s), i.e., $$\alpha^* = \text{argmax}_\alpha \sum_{f,r} p_{FR,\alpha}(f,r) \log_2 \frac{p_{FR,\alpha}(f,r)}{p_{F,\alpha}(f) p_{R,\alpha}(r)}. \quad (4)$$

For rigid transformations of 2D images, we have three-degrees of freedom $$\alpha^* = \{\varphi^*, x^*, y^*\}, \quad (5)$$

where $\varphi^*$, $x^*$, and $y^*$ represents rotation angle, horizontal shift, and vertical shift respectively. Once the parameters are determined, image registration can be executed with image transformation.

Step 225 of FIG. 2 can include a post processing step which can include decomposing each parameter matrix into a low-rank matrix of updated registration parameters and a sparse matrix corresponding to the registration parameter errors for each low-rank matrix, to obtain updated registration parameters for robust registration.

Robust Registration by Matrix Analysis

Problem Formulation:

Assume there are N images including a reference image and (N−1) unregistered images with objective to register all (N−1) images with the reference image. To improve the robustness of registration, then consider all possible pairs of N images for registration and jointly analyze the registration parameters. Let $\alpha_{i,j}=\{\varphi_{i,j}, x_{i,j}, y_{i,j}\}$ be the true registration parameter corresponding to the $i^{th}$ image as a floating image with the $j^{th}$ image as a reference image. For all possible image pairs, a set of matrices of registration parameters can be formed as follows $$A=\{\Phi=[\varphi_{i,j}], X=[x_{i,j}], Y=[y_{i,j}]\}. \quad (6)$$

In particular, if the first image is taken as the reference, i.e., j=1, then $\alpha_{i,1}=\{\varphi_{i,1}, x_{i,1}, y_{i,1}\}$ is the parameter of the transform matrix of the $i^{th}$(i=1, 2, ..., N) floating image. We define $\phi=[\varphi_{1,1}, \ldots, \varphi_{n,1}]\in \mathcal{R}^N$, $x=[x_{1,1}, \ldots, x_{n,1}]\in \mathcal{R}^N$, and $y=[y_{1,1}, \ldots, y_{n,1}]\in \mathcal{R}^N$. For rigid transformations, we have $\varphi_{i,j}=\varphi_{i,1}-\varphi_{j,1}$. It is straightforward to verify that $$\Phi=\phi 1^T - 1\phi^T, \quad (7)$$

where 1 is a N-dimensional vector with all entries being 1. Similarly, we have $X=x1^T - 1x^T$ and $Y=y1^T - 1y^T$ for rigid image transformations. Note that (7) shows that the true registration matrices have rank ($\Phi$)≤rank($\phi 1^T$)+rank ($1\phi^T$)=1+1=2, meaning $\Phi$ is a low-rank matrix of rank not greater than 2. We will rely on this property to denoise the registration matrices when registration errors occur.

In practice, the registration parameter matrices $A^*=\{\Phi^*, X^*, Y^*\}$ acquired by MI-based methods are generally noisy. To achieve robust image registration, one approach is to solve a least-squares problem with an explicit rank-2 constraint to extract the registration parameter. For example, for the rotational angle, we solve $$\bar\phi=\text{argmin}_\varphi \|\Phi^* - L(\varphi)\|_F^2, \quad (8)$$

where $$L(\varphi)=\varphi 1^T - 1\varphi^T. \quad (9)$$

The underlying assumption of the least-squares method is that the parameter error is random Gaussian noise, which is however not true in our problem.

Inspired by the robust principal component analysis (RPCA), alternative to the least-squares method we propose a sparsity-driven method to achieve robust registration parameters. It is realized by solving the following problem:

$$\min_{\varphi, S} \frac{\beta}{2} \|\Phi^* - L(\varphi) - S\|_F^2 + \|vec\{S\}\|_1, \quad (10)$$

where L represents a low-rank matrix and S denotes a sparse outlier matrix. The difference between (10) and RPCA is that here we impose a strict rank 2 structure on L whereas RPCA looks for a general low rank matrix. The low-rankness is satisfied automatically by its definition in (9). Other registration parameters such as the horizontal shift and the vertical shift can be achieved in a similar way.

Step 230 of FIG. 2 can include using the updated registration parameters to form a transformation matrix to register the images of the image data with at least one reference image, resulting in robust registration of the images. Wherein the resulting robust registration of the images provides improved fusion performance such as increased spatial resolution, among other aspects and benefits.

Algorithm:

To solve (10), an alternating minimization method is used. First a step is used to initialize S as $S^0=0$, then and step is used to update S and $\phi$ sequentially as follows:

For k=1, ..., K $$\varphi^k = \text{argmin}_\varphi \frac{\beta}{2} \|\Phi^* - L(\varphi) - S^{k-1}\|_F^2, \quad (11)$$

$$S^k = \text{argmin}_S \frac{\beta}{2} \|\Phi^* - L(\varphi^k) - S\|_F^2 + |vec\{S\}|_1. \quad (12)$$

The first updating process in (11) is a standard least-squares problem, which can be, solve using the pseudo-inverse of the project matrix of $\phi$. The second updating process in (12) is a simplified LASSO problem for which the solution is given by $$S^k = (\Phi^* - L(\varphi^k)) \circ \max\left(0, 1 - \frac{1}{\beta|\Phi^* - L(\varphi^k)|}\right), \quad (13)$$

where ∘ represents element-wised product.

The iterative algorithm is terminated until a convergence criterion meets such as $$\frac{|\varphi^{k+1} - \varphi^k|_2}{|\varphi^{k+1}|_2} < \epsilon, \quad (14)$$

where $\epsilon \ll 1$ is a preset small positive number.

EXPERIMENTATION/SIMULATION

Figure 3A:
FIG. 3A is a registration reference image illustrating a reference, for example, high resolution Pan image from experimentation, according to some experimentation of the present disclosure.

FIG. 3A is a registration reference image illustrating a reference image from experimentation, according to some experimentation of the present disclosure. For example, FIG. 3A is a photo of a high resolution Pan image that is used as a reference image, such that in order to validate at least one method of the present disclosure, the problem of registering MS images with the corresponding Pan image is examined using the mutual information based method.

Figure 3B:
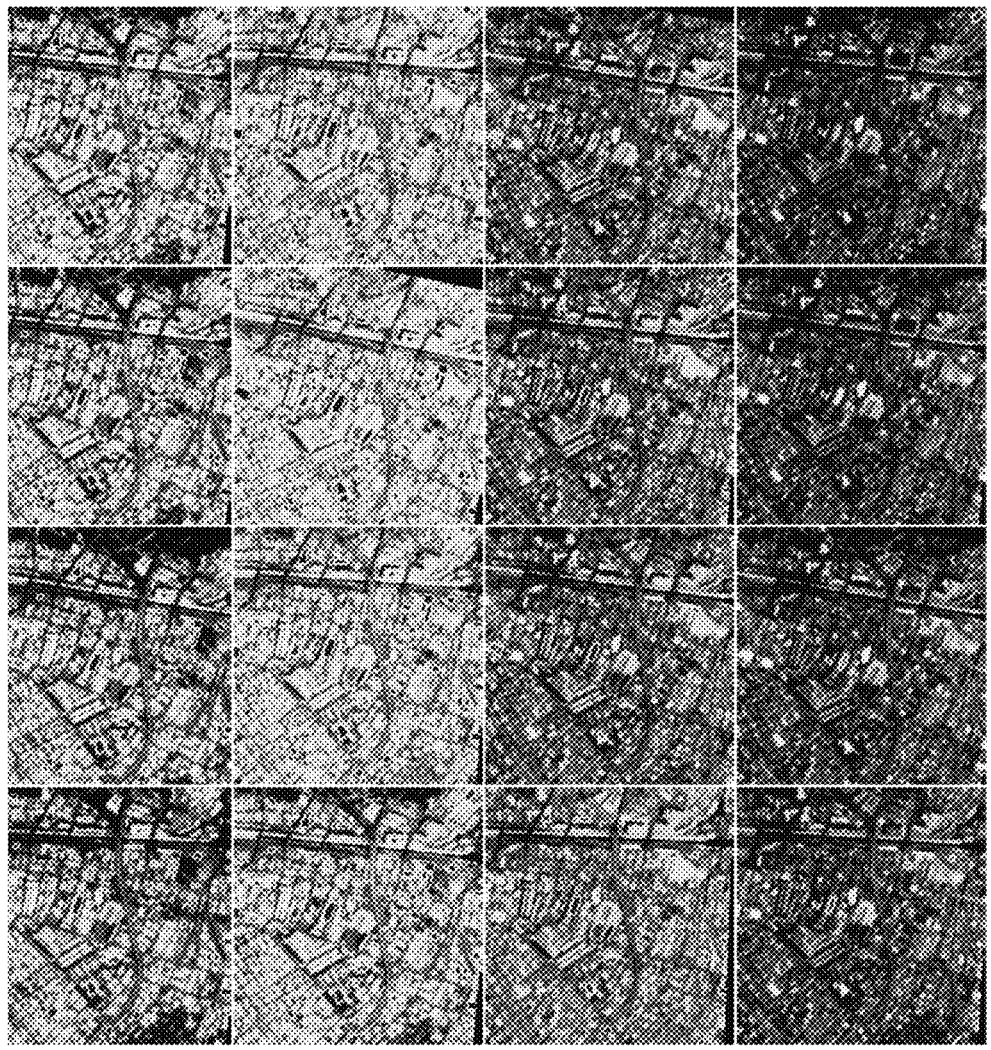
FIG. 3B are un-registered images illustrating a mosaic of 16 un-registered images (including images such as RGB, infra-red, near infra re and short wave infra-red, etc.) from experimentation, according to some experimentation of the present disclosure.

FIG. 3B are un-registered images illustrating a mosaic of 16 un-registered images from experimentation, according to some experimentation of the present disclosure. For example, FIG. 3B, can have 16 multi-spectral images (including RGB, infrared, near-infra-red, and short wave infra-red, etc.) are considered to register with the reference Pan image for further fusion process. For example, in order to simulate un-registered images, rigid transformations are performed on a well-registered image set, wherein each band image with a random transformation of parameters $\tilde{\alpha} = \{\tilde{\phi}, \tilde{x}, \tilde{y}\}$ i.i.d drawn from uniform distributions ($\tilde{\phi} \in [-3, 3]$ in degree, $\tilde{x} \in [-50, 50]$ and $\tilde{y} \in [-50, 50]$ in pixel).

Figure 3C:
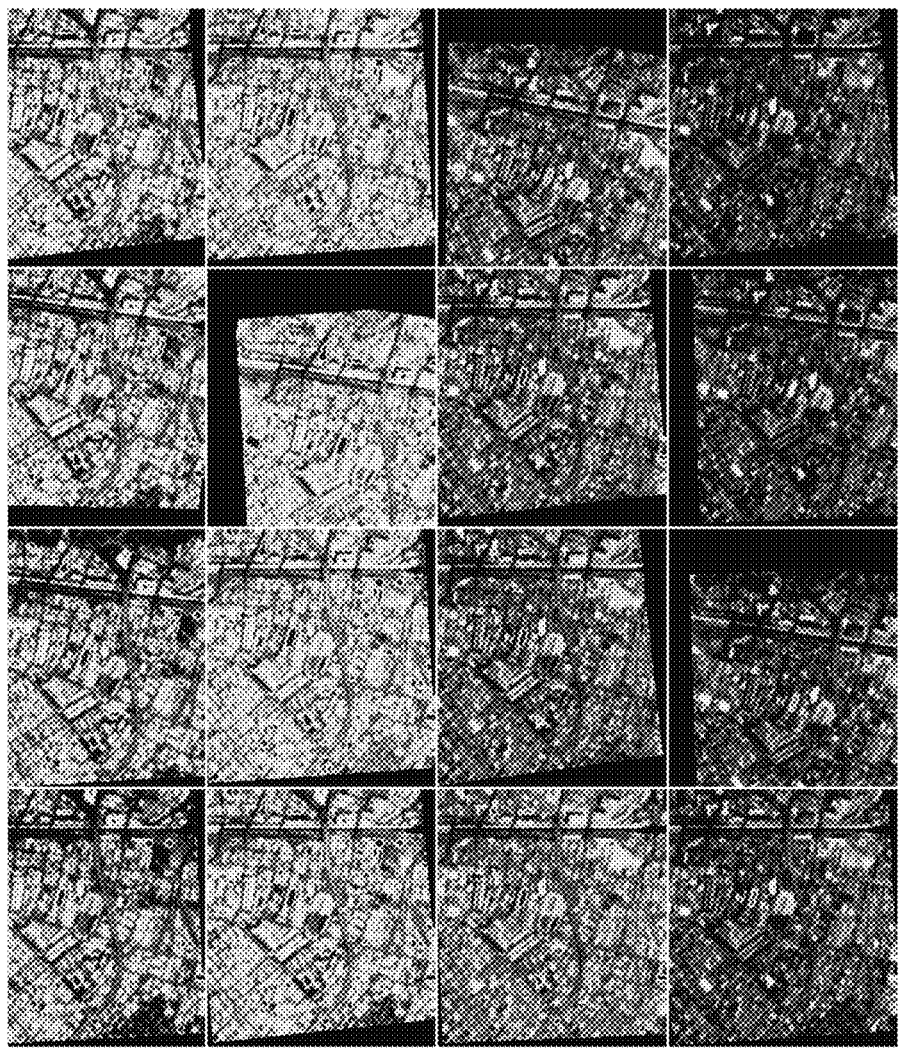
FIG. 3C are registered images illustrating images registered using mutual information, according to some embodiments of the present disclosure.

FIG. 3C are registered images illustrating images registered using initial estimated registration parameters using mutual information based method, according to embodiments of the present disclosure. As can be viewed, several bands totally failed to register with the panchromatic image due to the divergence of optimization algorithm.

Figure 3D:
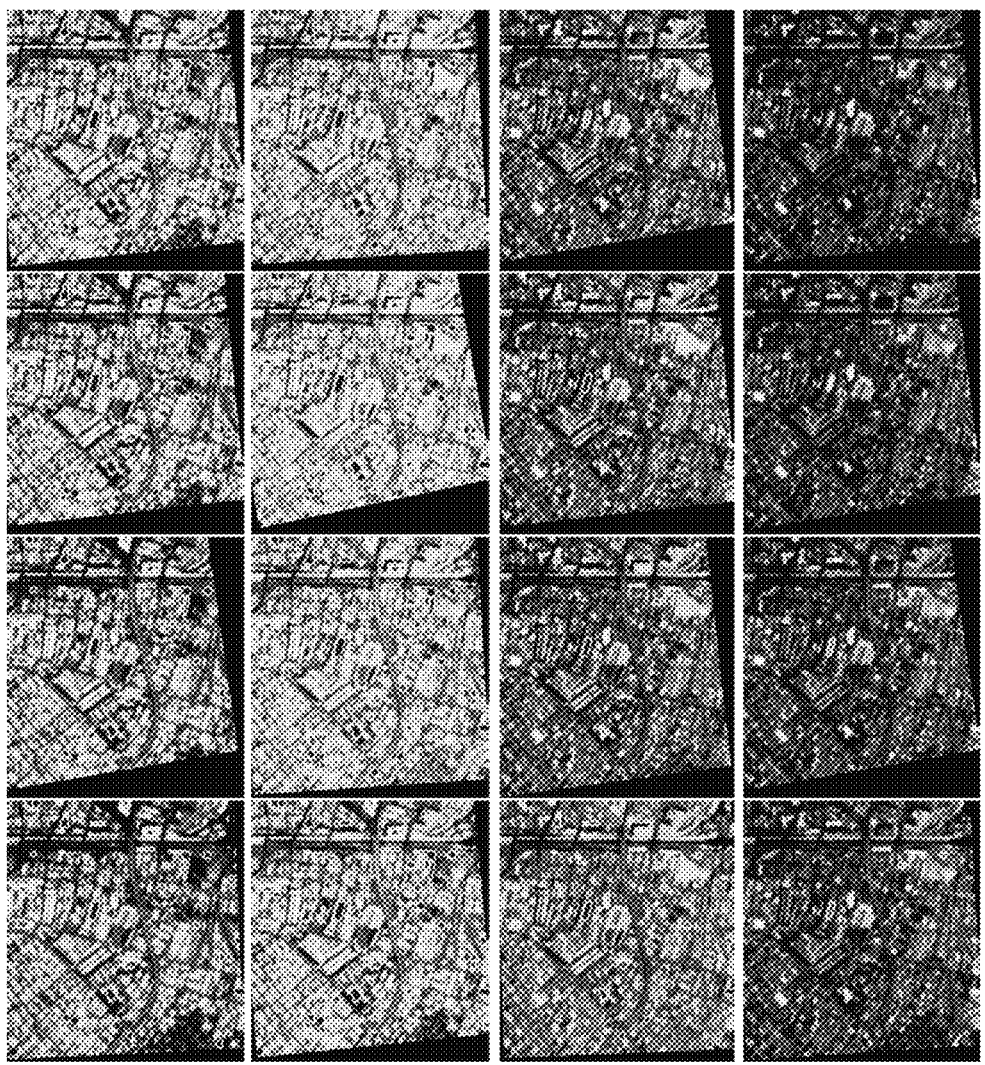
FIG. 3D are registered images illustrating images registered using mutual information and sparsity-driven post process, according to some embodiments of the present disclosure.

FIG. 3D are registered images illustrating images registered using updated registration parameters using mutual information based method and sparsity-driven post process, according to embodiments of the present disclosure. As can be viewed, all images are well registered with the reference panchromatic image with robust registration performance.

Figure 4:
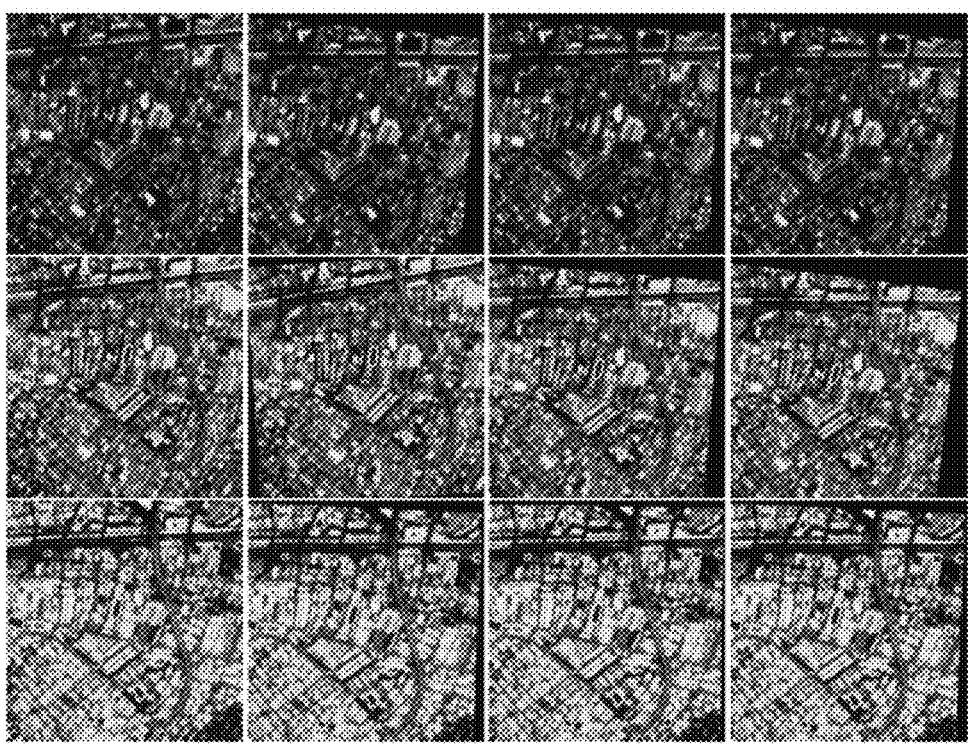
FIG. 4 are images before registration and after registration using different registration methods, according to some embodiments of the present disclosure.

FIG. 4 are images illustrating images before registration and after registration using different registration methods, according to embodiments of the present disclosure. For example, FIG. 4 shows columns 1, 2, and 3, wherein each column corresponds to a spectral band, and Rows A of FIG. 4 shows unregistered MS images.

Row B of FIG. 4 shows the registered images respectively using the MI method. Observed from Row B is that some image registration in the images are not well registered.

Row C of FIG. 4 shows all the registered images using registration parameters estimated by the MI method combined using the least-squares method. Noticed in Row C is that some image registration is getting a little better, but still with a small rotation angle, however, the registration results are not to a level of quality admissible for meeting standards of the present disclosure and many of today's imaging processing technological needs within the image process industry.

Row D of FIG. 4 illustrate registration using the MI-based plus sparsity-driven method, according to some systems and methods of the present disclosure. According to the method of the present disclosure, we set $\beta=50$, K=500, and $\epsilon=1\times$ $10^{-4}$, as can be viewed in Row D, all the MS images are very well registered with the Pan image visually.

Figure 5A:
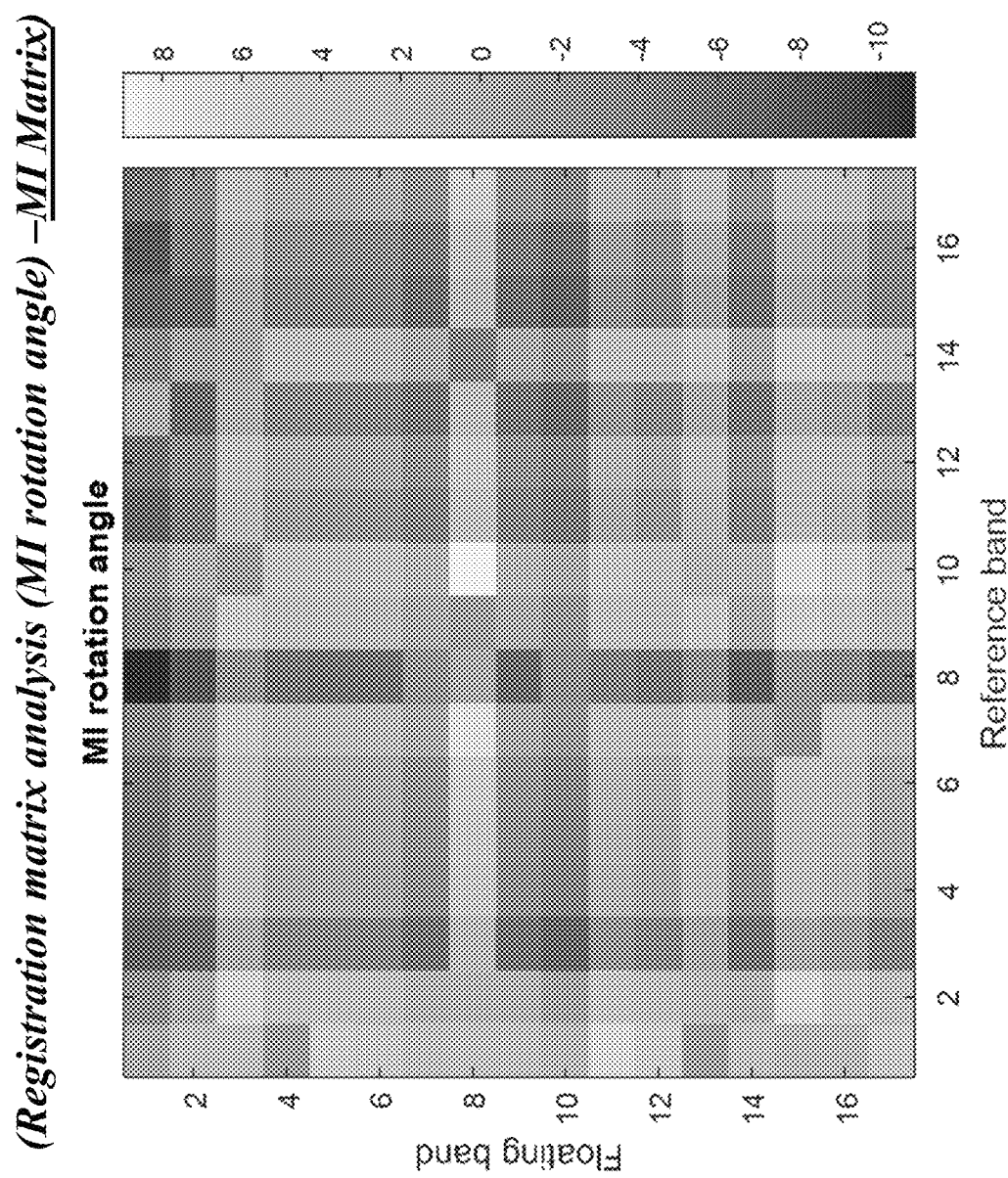
FIG. 5A is a graph illustrating a registration parameter matrix of rotation angle using the mutual information process from experimentation, according to some experimentation of the present disclosure.

FIG. 5A is a graph illustrating registration parameter matrix of rotation angle estimated by the mutual information based method from experimentation, and to be decomposed into a low-rank matrix and a sparse matrix, according to embodiments of the present disclosure.

Figure 5B:
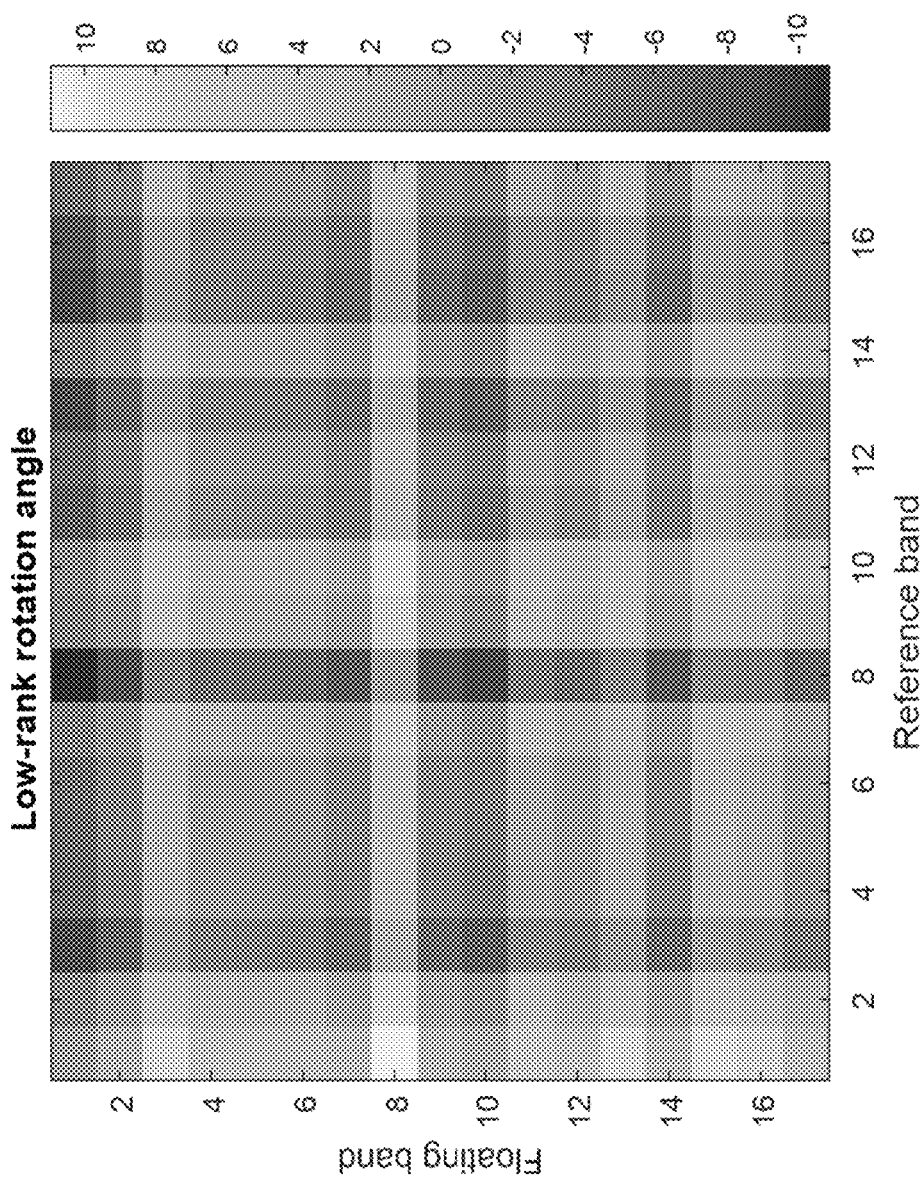
FIG. 5B is a graph illustrating a low-rank registration parameter matrix of robust registration parameter of rotation angle using robust decomposition analysis from experimentation, according to some experimentation of the present disclosure.

FIG. 5B is a graph illustrating a low-rank registration parameter matrix of updated rotation angle parameters from experimentation, according to some experimentation of the present disclosure.

Figure 5C:
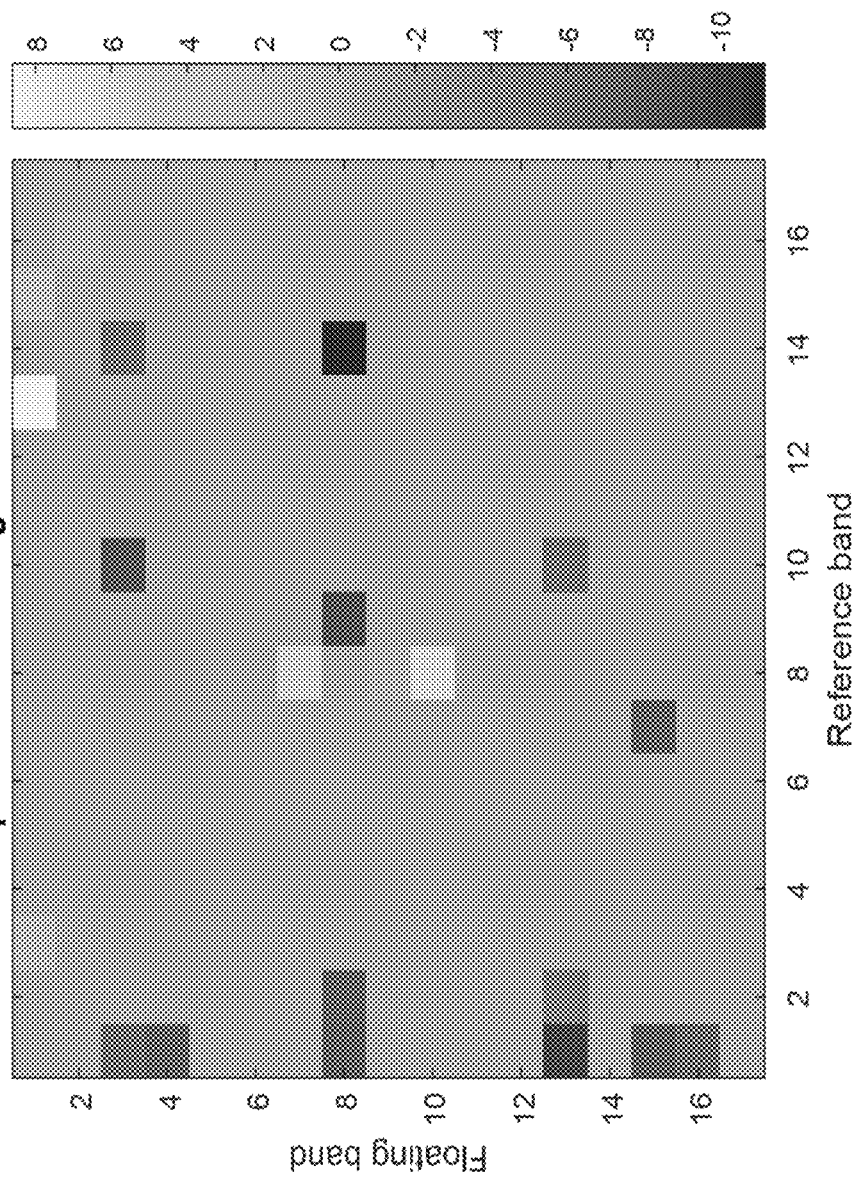
FIG. 5C is a graph illustrating a sparse registration parameter matrix of rotation angle error from experimentation, according to some experimentation of the present disclosure.

FIG. 5C is a graph illustrating a sparse registration parameter matrix of rotation angle errors in a post process from experimentation, according to some experimentation of the present disclosure.

Figure 6A:
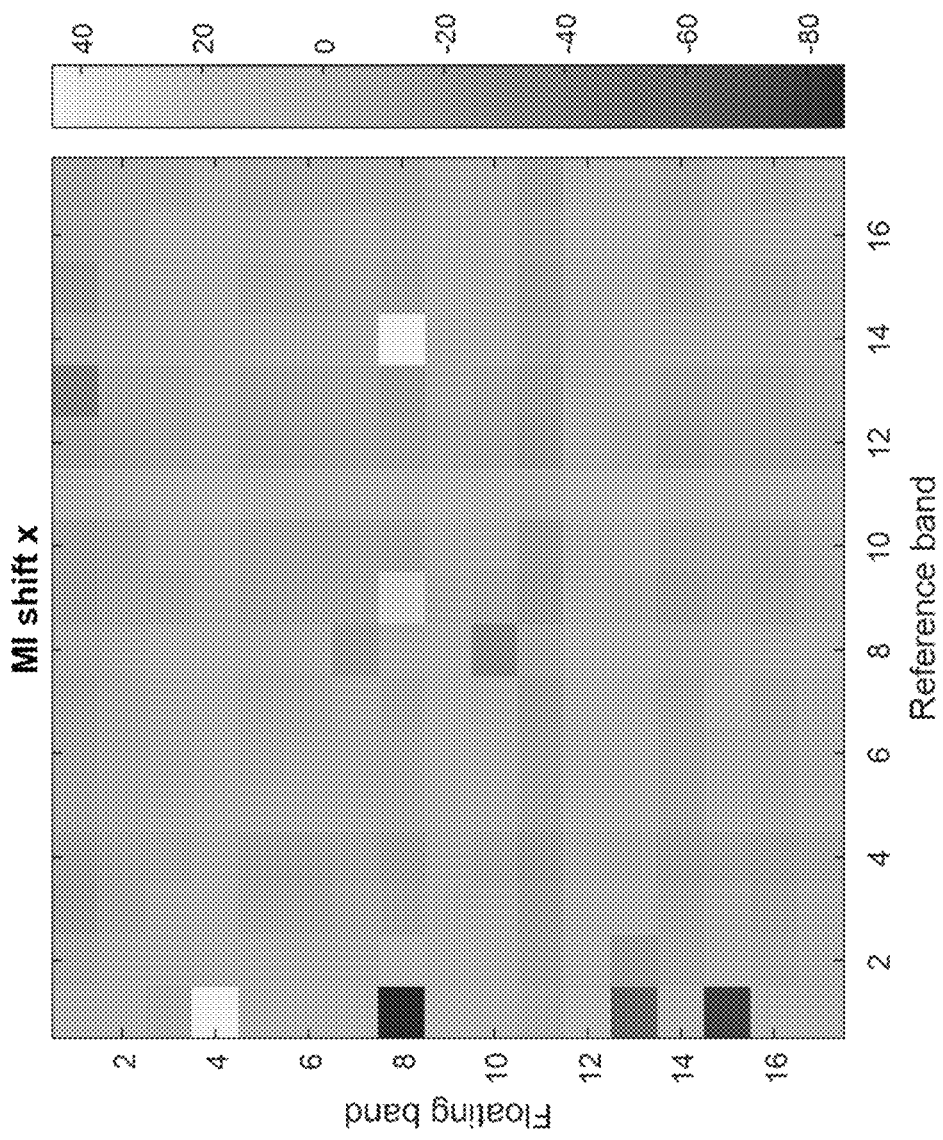
FIG. 6A is a graph illustrating a registration parameter matrix of horizontal shift using the mutual information process from experimentation, according to some experimentation of the present disclosure.

FIG. 6A is a graph illustrating a registration parameter matrix of horizontal shift estimated by the mutual information based method from experimentation, and to be decomposed into a low-rank matrix and a sparse matrix, according to some experimentation of the present disclosure.

Figure 6B:
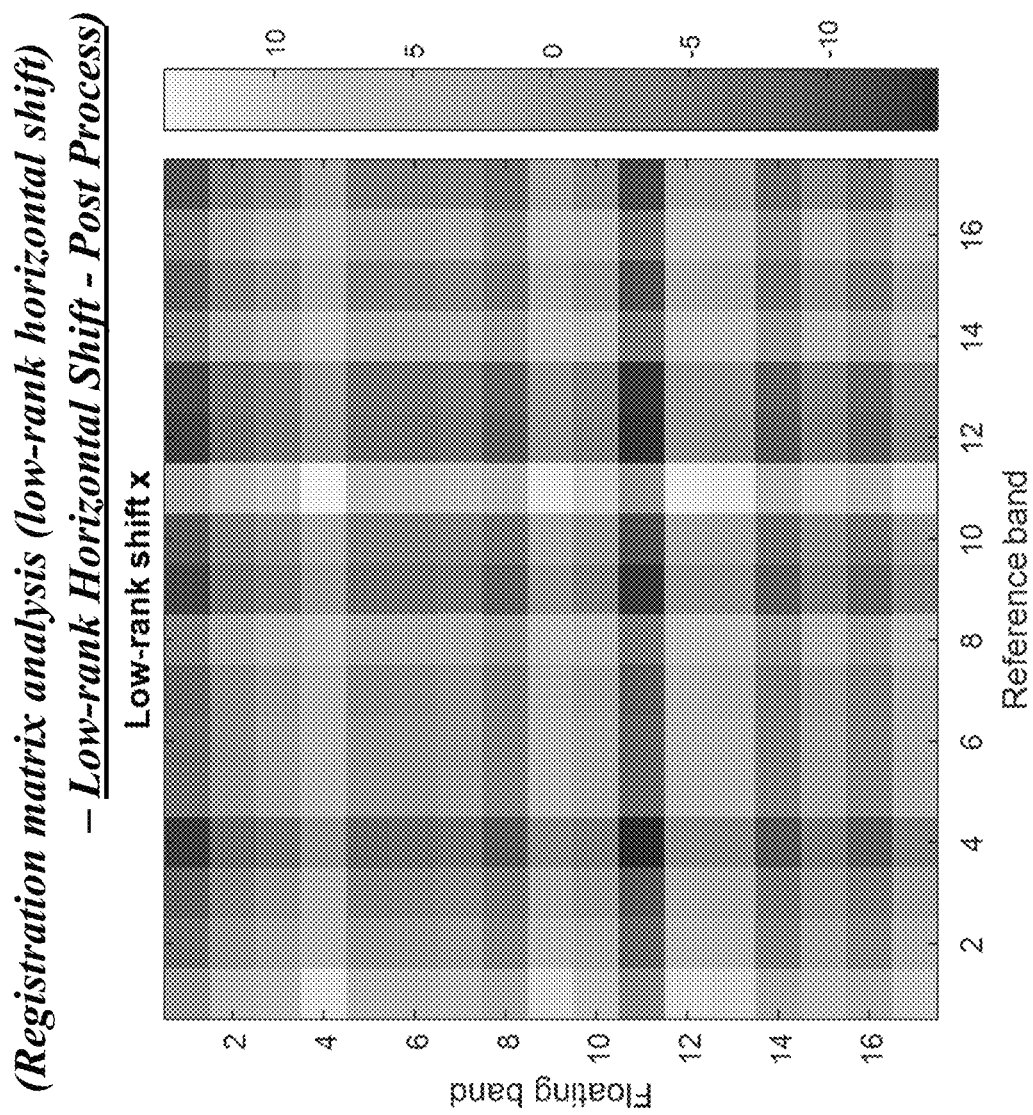
FIG. 6B is a graph illustrating a low-rank registration matrix of robust registration parameter of horizontal shift using robust decomposition analysis from experimentation, according to some experimentation of the present disclosure.

FIG. 6B is a graph illustrating a low-rank registration parameter matrix of updated horizontal shift parameters from experimentation, according to some experimentation of the present disclosure.

Figure 6C:
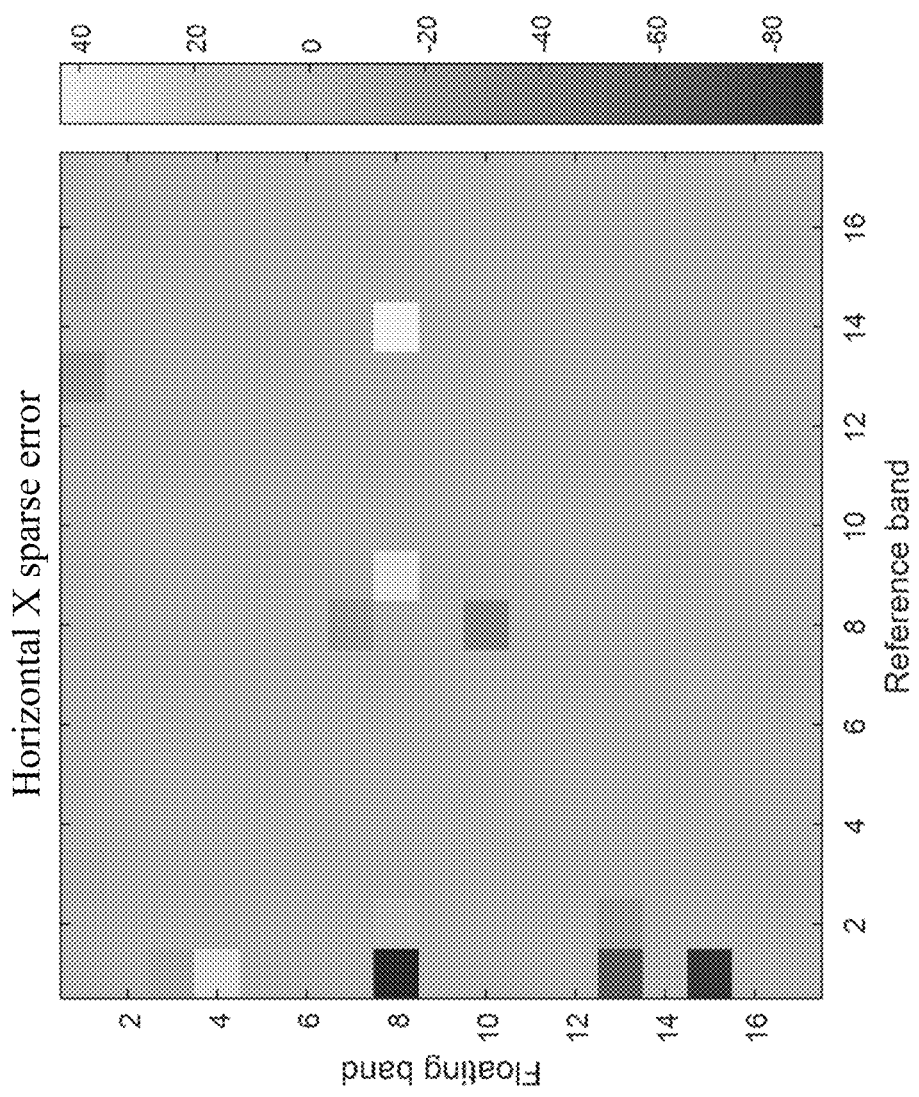
FIG. 6C is a graph illustrating a sparse registration parameter matrix of horizontal shift error from experimentation, according to some experimentation of the present disclosure.

FIG. 6C is a graph illustrating a sparse registration parameter matrix of horizontal shift errors from experimentation, according to some experimentation of the present disclosure.

Figure 7A:
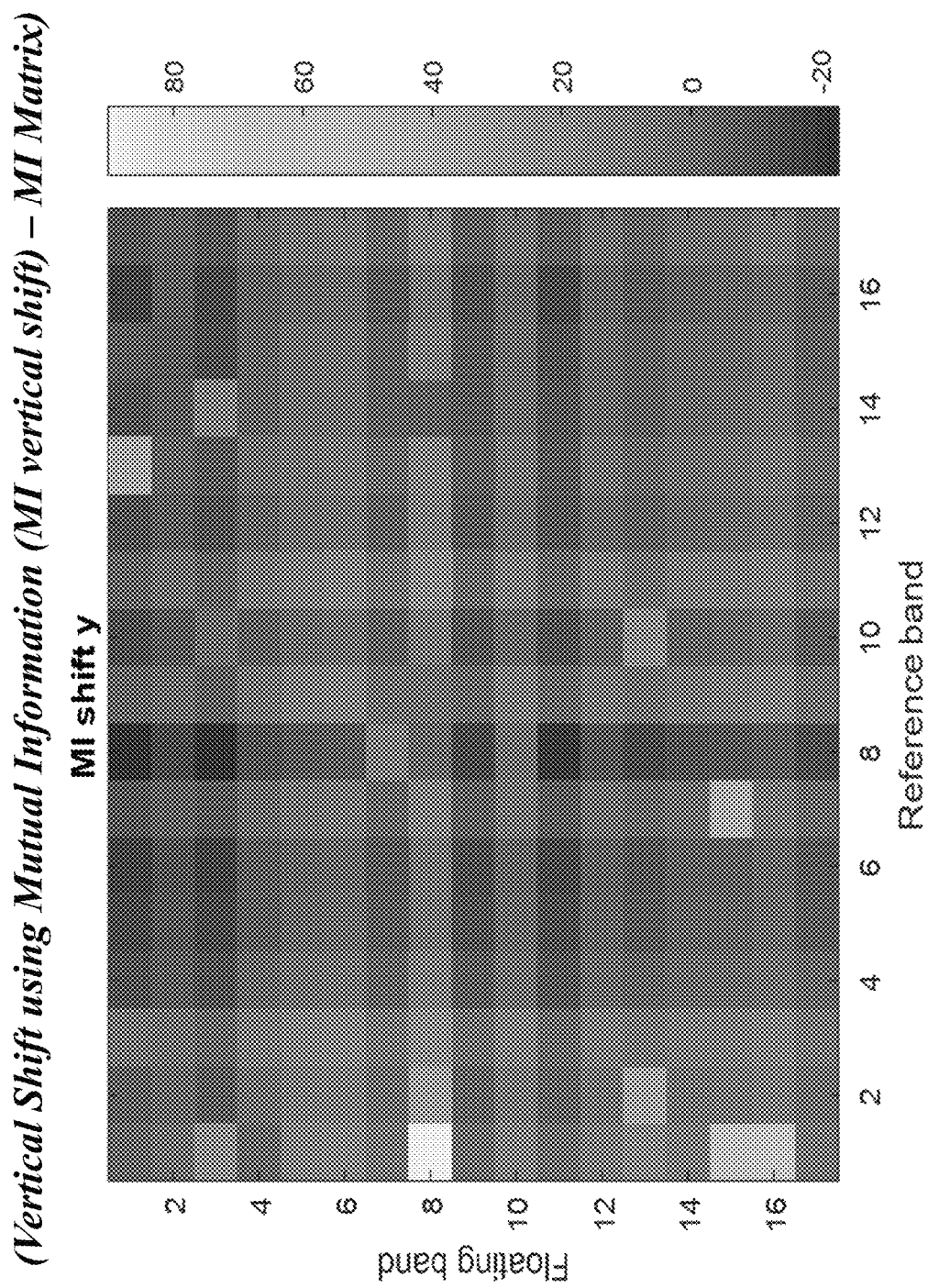
FIG. 7A is a graph illustrating a registration parameter matrix of vertical shift using the mutual information process from experimentation, according to some experimentation of the present disclosure.

FIG. 7A is a graph illustrating a registration parameter matrix of vertical shift estimated by the mutual information based method from experimentation, according to some experimentation of the present disclosure.

Figure 7B:
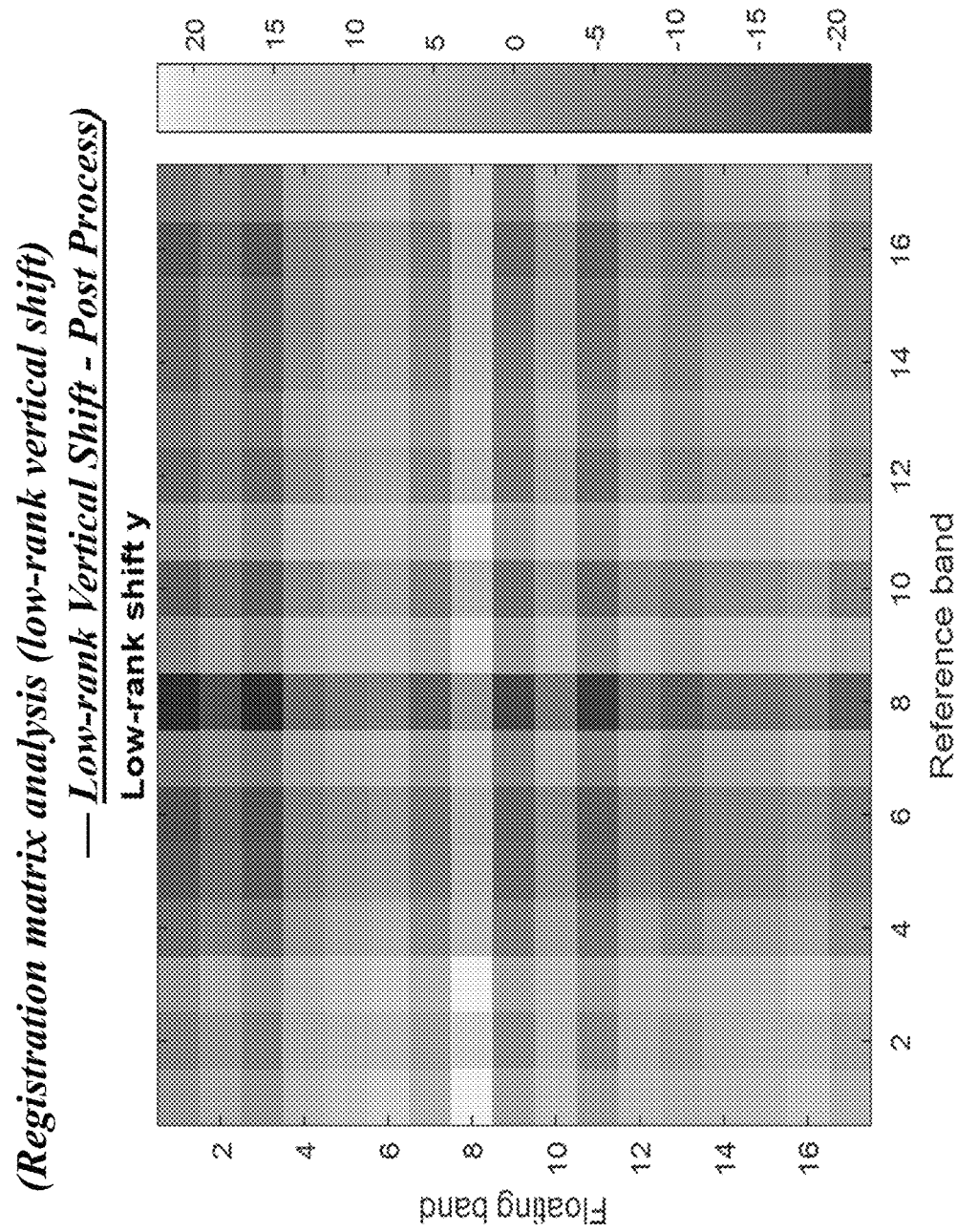
FIG. 7B is a graph illustrating a low-rank registration matrix of vertical shift using robust decomposition analysis from experimentation, according to some experimentation of the present disclosure.

FIG. 7B is a graph illustrating a low-rank registration parameter matrix of updated vertical shift parameters from experimentation, according to some experimentation of the present disclosure.

Figure 7C:
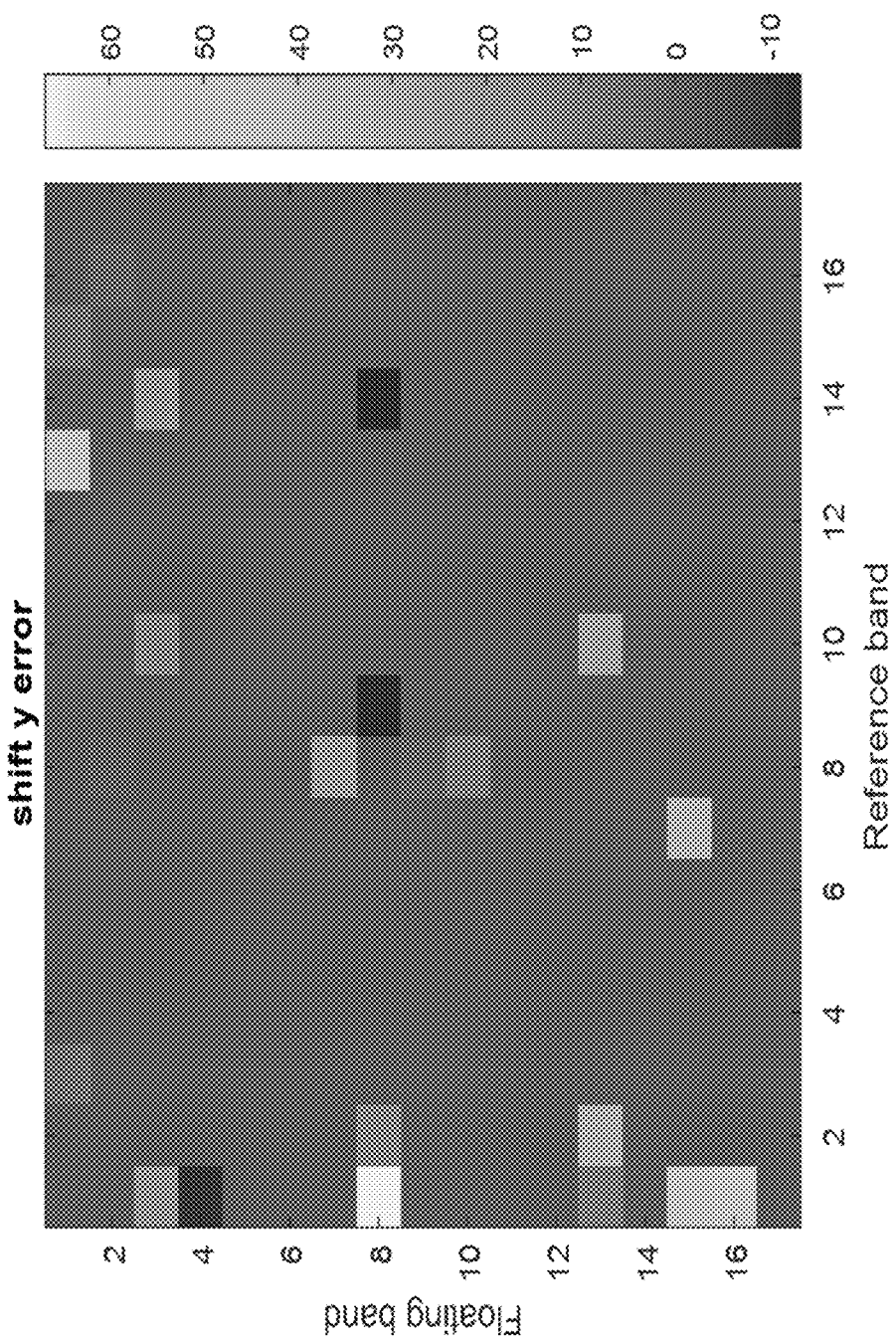
FIG. 7C is a graph illustrating a registration parameter matrix of vertical shift error from experimentation, according to some experimentation of the present disclosure.

FIG. 7C is a graph illustrating a sparse registration parameter matrix of vertical shift errors from experimentation, according to some experimentation of the present disclosure.

Figure 8A:
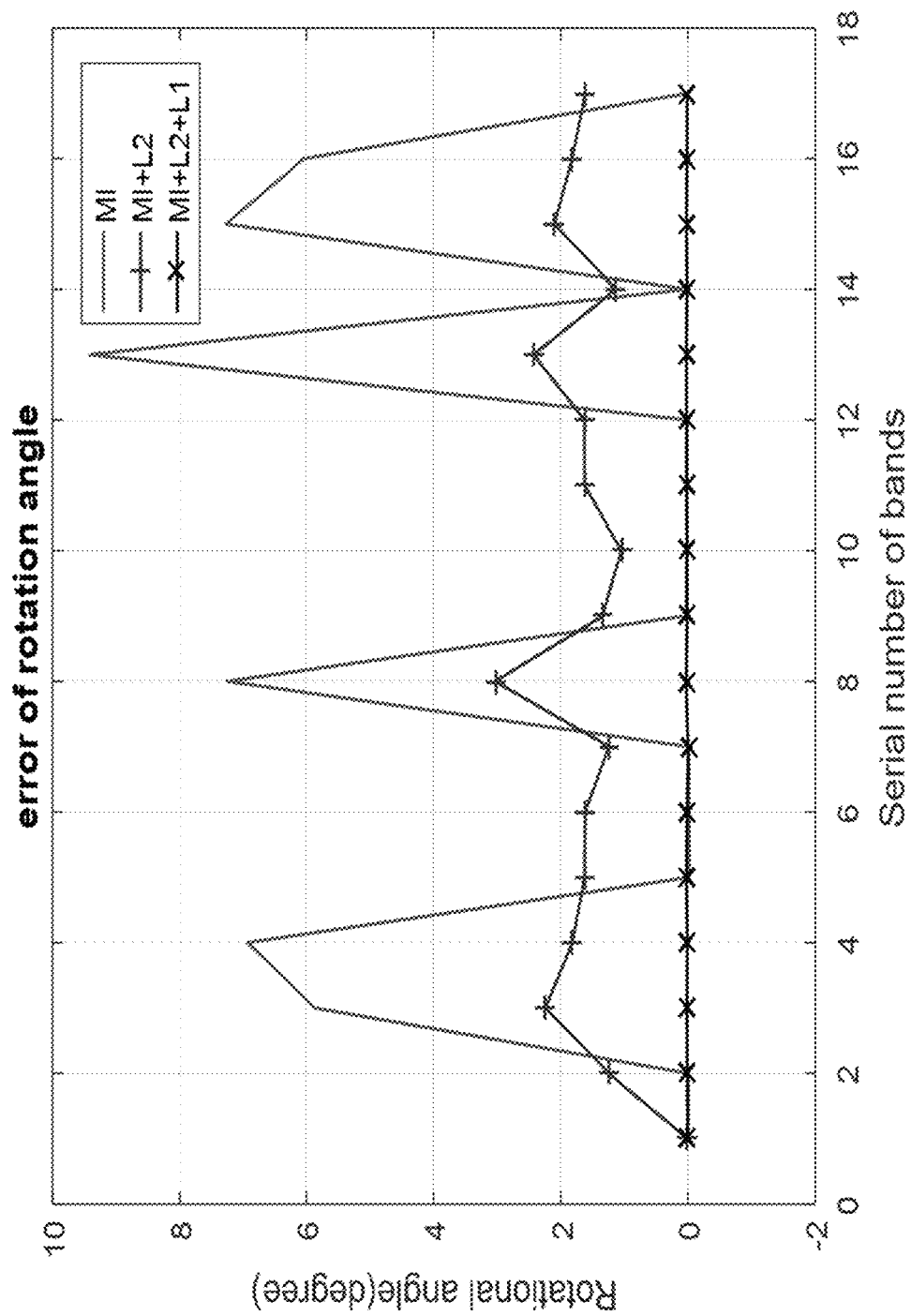
FIG. 8A is a graph illustrating a comparison of registration errors for rotation angles, for mutual information (MI), mutual information plus least-squares (MI+L2) method, and mutual information plus least-squares plus sparsity-driven (MI+L2+L1) method, from experimentation, according to some experimentation of the present disclosure.
Figure 8B:
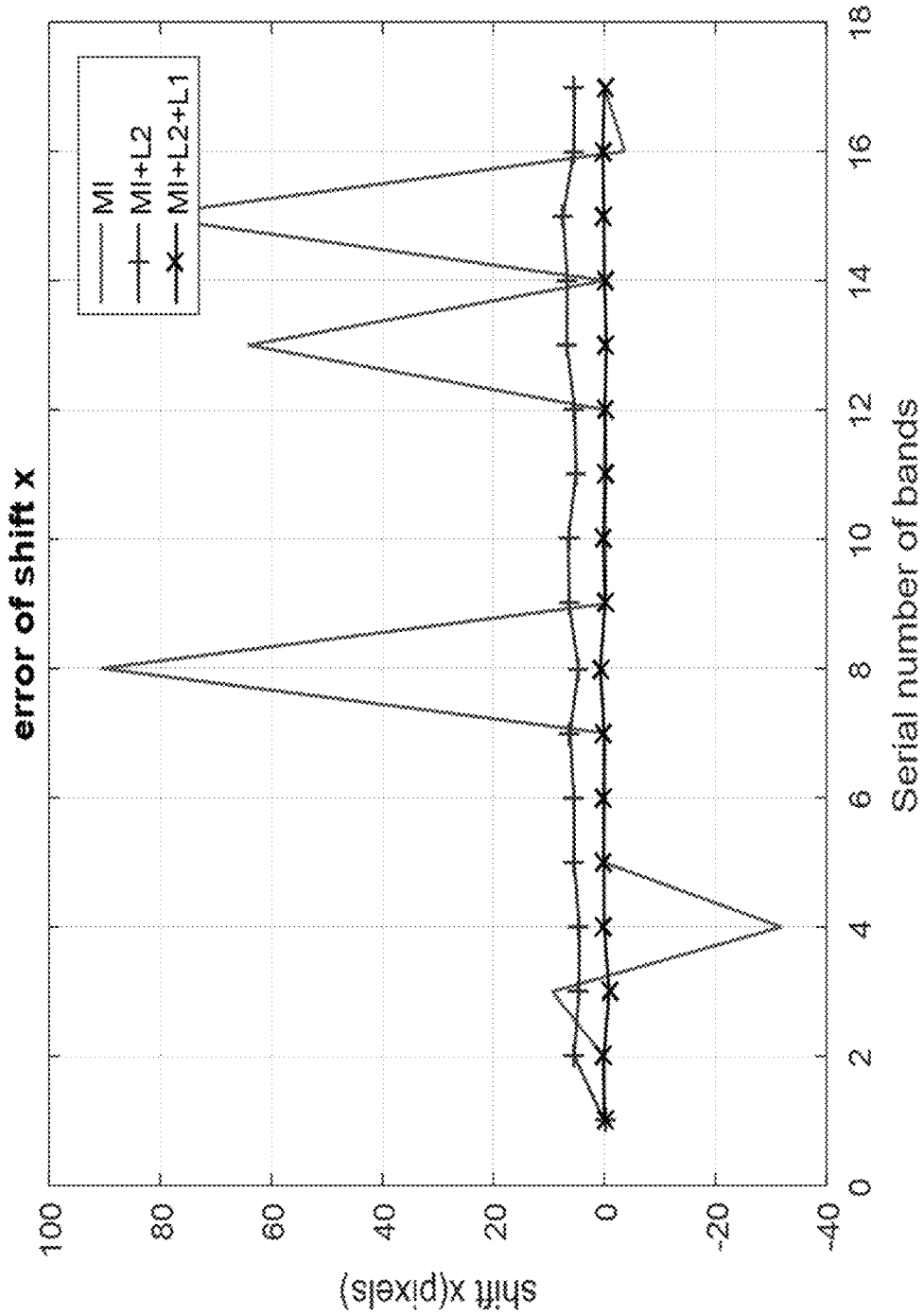
FIG. 8B is a graph illustrating a comparison of registration errors for horizontal shifts, for mutual information (MI), mutual information plus least-squares (MI+L2) method, and mutual information plus least-squares plus sparsity-driven (MI+L2+L1) method, from experimentation, according to some experimentation of the present disclosure.
Figure 8C:
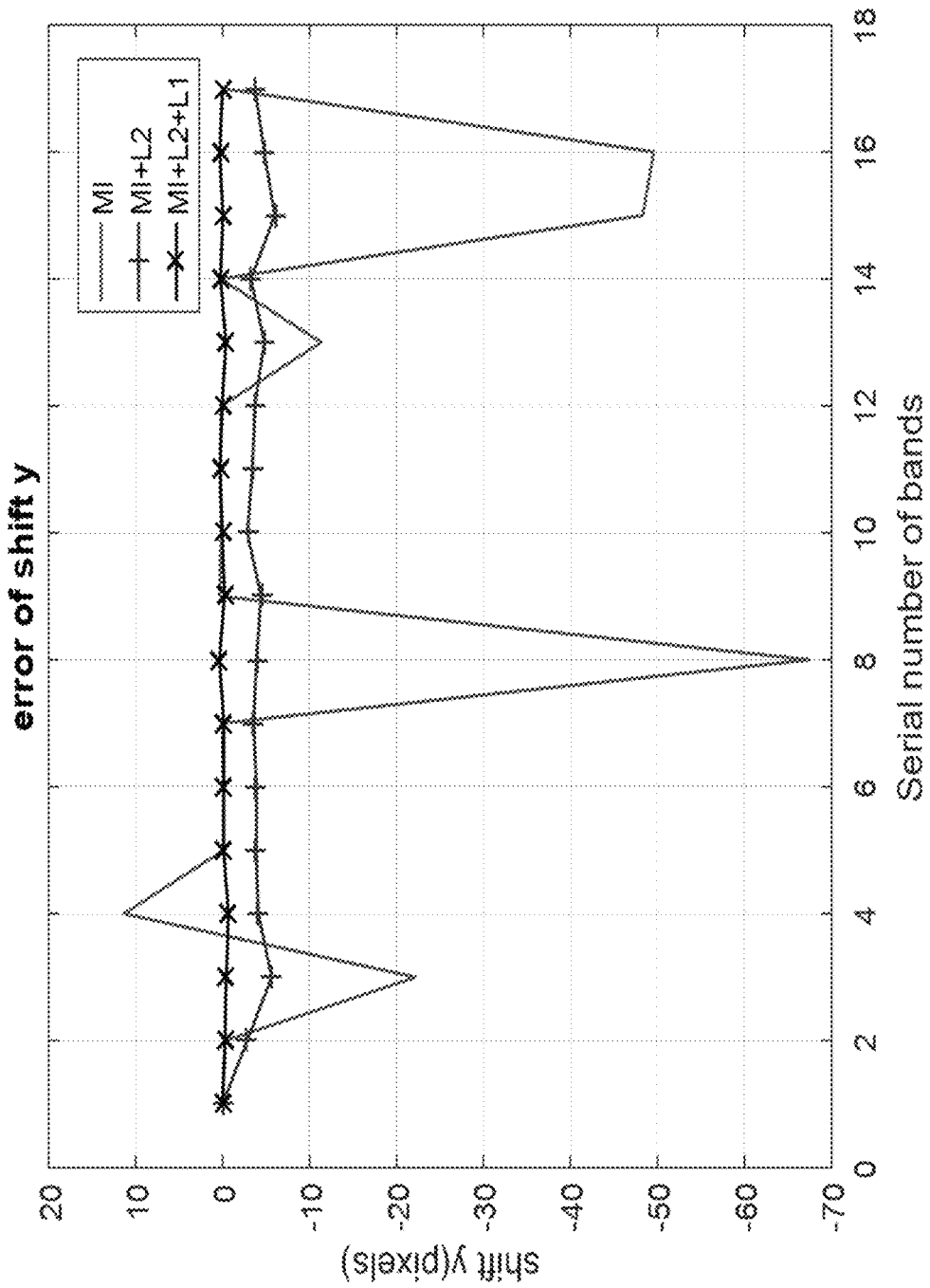
FIG. 8C is a graph illustrating a comparison of registration errors for vertical shifts, for mutual information (MI), mutual information plus least-squares (MI+L2) method, and mutual information plus least-squares plus sparsity-driven (MI+L2+L1) method, from experimentation, according to some experimentation of the present disclosure.

Referring to FIGS. 8A, 8B and 8C, the errors between the registration parameter and the true image transformation parameter are compared.

FIG. 8A is a graph illustrating a comparison of registration errors for rotation angles, for mutual information (MI), mutual information plus least-squares (MI+L2) method, and mutual information plus least-squares plus sparsity-driven (MI+L2+L1) method, from experimentation, according to some experimentation of the present disclosure. Observed is that for the MI based method, some spectral images are not well registered with relative large rotation angle errors. Further, by combining all parameters using the least-squares analysis (MI+L2), the errors are significantly reduced, but still lie in the range of [0, 4] degrees.

However, if the robust method of the present disclosure is used (MI+L2+L1), the rotation angle errors reduce to nearly zeros for all 16 multi-spectral images, leading to accurate and robust image registration.

FIG. 8B is a graph illustrating a comparison of registration errors for horizontal shifts, for mutual information (MI), mutual information plus least-squares (MI+L2) method, and mutual information plus least-squares plus sparsity-driven (MI+L2+L1) method, from experimentation, according to some experimentation of the present disclosure.

FIG. 8C is a graph illustrating a comparison of registration errors for vertical shifts, for mutual information (MI), mutual information plus least-squares (MI+L2) method, and mutual information plus least-squares plus sparsity-driven (MI+L2+L1) method, from experimentation, according to some experimentation of the present disclosure.

As can be understood from FIGS. 8A, 8B and 8C, the systems and methods of the present disclosure provide a robust sparsity-driven image registration method for multiple image registration that solves the conventional divergence problems of mutual information based image registration.

Further, the systems and methods of the present disclosure are examined on registering high-resolution panchromatic image and low-resolution multi-spectral images under rigid transformations with random parameters. Wherein the results show that, the systems and methods of the present disclosure significantly improve the accuracy and robustness for multiple image registration when the mutual information based registration fails to register some images correctly.

Features

According to another embodiment of the present disclosure, computer-implemented method for multiple image registration of images a scene or an object. The computer-implemented method including receiving image data of the scene or the object. The image data can include images collected from different measurements of a single modality or multiple modalities, either at different rotation angles, horizontal shifts, or vertical shifts, of the scene. Estimating registration parameters, through an image processor, using pairs of images from the received image data, wherein each pair of images includes a reference image and a floating image. Generating parameter matrices corresponding to registration parameters including an image rotation angle matrix, an image horizontal shift matrix and an image vertical shift matrix, using an image registration process for all pairs of images. Decomposing each parameter matrix into a low-rank matrix of updated registration parameters and a sparse matrix corresponding to the registration parameter errors for each low-rank matrix, to obtain updated registration parameters for robust registration. Using the updated registration parameters to form a transformation matrix to register the images of the image data with at least one reference image, resulting in robust registration of the images. Wherein the following aspects below are contemplated as configuring one or a combination of modified embodiments of the above embodiment.

According to an aspect of the present disclosure, in view of the above embodiment, the image registration process is one of a mutual information (MI) process, a cross-correlation process or a feature-based process. Another aspect can include each pair of images entered in a parameter matrix correspond to the registration parameter between the floating image and the reference image.

According to an aspect of the present disclosure, in view of the above embodiment, the image data includes multi-spectral (MS) images, panchromatic (PAN) images, color images, or some combination, of the scene. Further another aspect may include the image data of multiple modalities including one of CT images or MRI images, or both, of the object, and/or the image data includes radar images of the scene. Further still, the image data can include a single modality or different modalities, including one or a combination of multispectral (MS) images, panchromatic (PAN) images, color images, of the scene.

Another aspect can be that the parameter matrices are generated in parallel by the imaging processor, resulting in a less computational time, when compared to a total computation time of generating each parameter matrix of the parameter matrices separately.

According to an aspect of the present disclosure, the low-rank matrix of updated registration parameters is imposed with a strict rank ≤2 structure on the low-rank matrix. Further, another aspect can be that the registering of the images using the updated registration parameters to form the transformation matrix continues until a predetermined convergence threshold is met, such that the registering ends, resulting in the robust registration of the images. Wherein the predetermined convergence threshold is a positive number.

According to an aspect of the present disclosure, in view of the above embodiment, further comprising, receiving the image data via a transceiver, and storing the image data in a memory. Wherein the memory and the transceiver are in communication with the image processor, such that previously stored in the memory is data, the data includes image historical data of the scene, image historical data of the object, or image historical data of both the scene and the object, the image registration process, along with stored instructions executable by the image processor. Another aspect of the above embodiment can include further comprising, using an input interface to acquire the image data; and storing the image data in an image database of the storage medium. Wherein the storage medium also includes an image processing database having previously stored data, the data includes image historical data of the scene, image historical data of the object, or both the image historical data of the scene and the object, the image registration process, along with stored instructions executable by the computer. Wherein an amount of stored image data in the image database is larger than all amounts of data in the image processing database. Such that the storage medium requires a lesser amount of computer processing time for operating the method due to processing less data by separately accessing the image processing database, when compared to accessing data from a combined databased including all data from the image database and data from the imaging processing database.

Definitions

CT Images:

According to the systems and methods can be understand as "computed tomography" (CT) which is referred to as X-ray CT, and can be used in the medical technology fields and in industrial imaging applications. For example, medical imaging can include uses as part of part of biological imaging and incorporates radiology which uses the imaging technologies of X-ray radiography, magnetic resonance imaging, medical ultrasonography or ultrasound, endoscopy, elastography, tactile imaging, thermography, medical photography and nuclear medicine functional imaging techniques as positron emission tomography (PET) and Single-photon emission computed tomography (SPECT). Just as in medical imaging, industrial imaging applications can include both nontomographic radiography (industrial radiography) and computed tomographic radiography (computed tomography). But, many other types of CT exist, such as positron emission tomography (PET) and single-photon emission computed tomography (SPECT). X-ray tomography, a predecessor of CT, is one form of radiography, along with many other forms of tomographic and nontomographic radiography. In regard to industrial applications of X-ray CT, some use irradiation to produce three-dimensional internal and external representations of a scanned object, which is used for internal inspection of components. Some key uses for industrial CT scanning include flaw detection, failure analysis, metrology, assembly analysis and reverse engineering applications and non-destructive material analysis.

Figure 9:
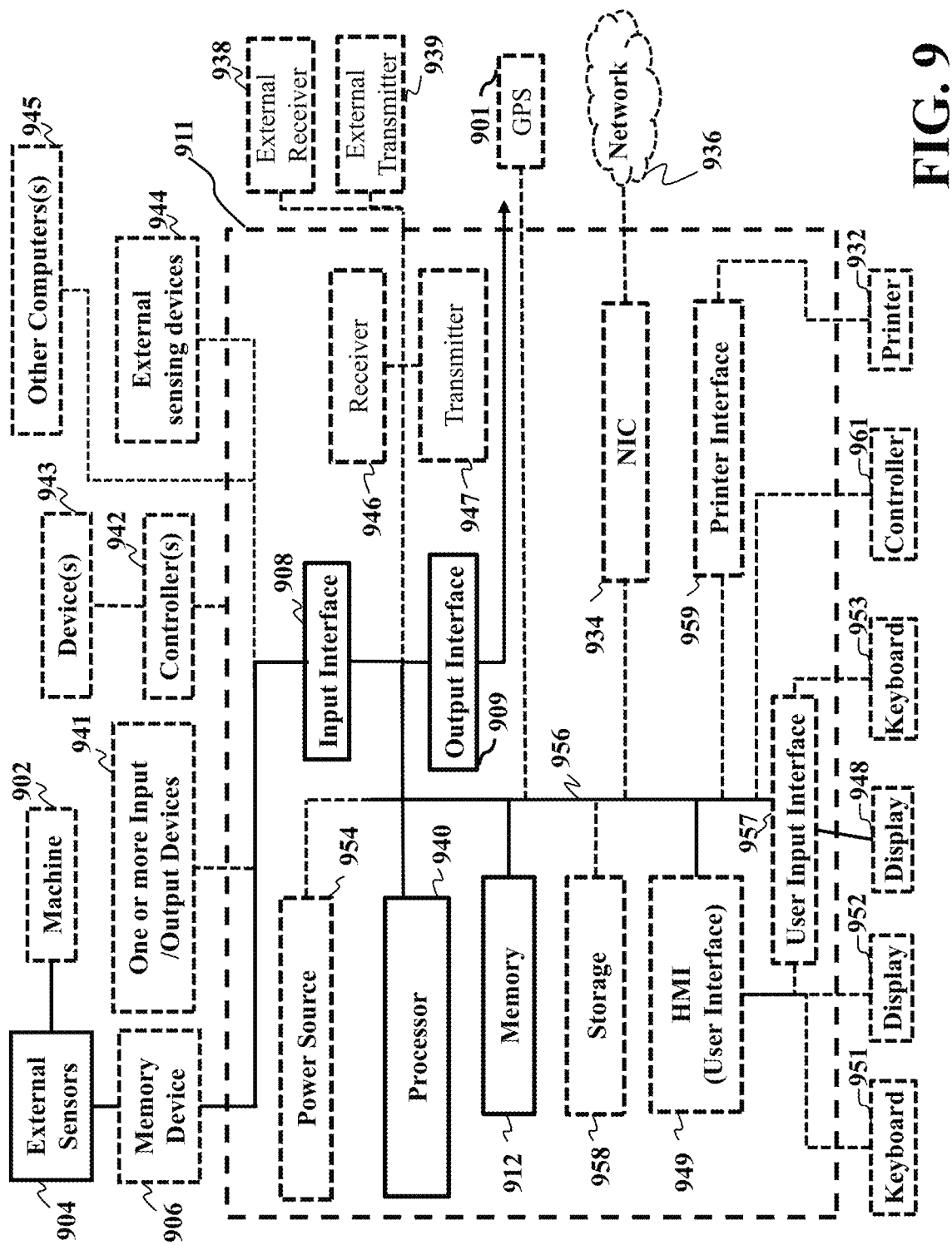
FIG. 9 is a block diagram of illustrating the method of FIG. 1A, that can be implemented using an alternate computer or processor, according to some embodiments of the present disclosure.

FIG. 9 is a block diagram of illustrating the method of FIG. 1A, that can be implemented using an alternate computer or processor, according to embodiments of the present disclosure. The computer 911 includes a processor 940, computer readable memory 912, storage 958 and user interface 949 with display 952 and keyboard 951, which are connected through bus 956. For example, the user interface 964 in communication with the processor 940 and the computer readable memory 912 acquires and stores the image data in the computer readable memory 912 upon receiving an input from a surface, keyboard 953, of the user interface 957 by a user.

The computer 911 can include a power source 954; depending upon the application the power source 954 may be optionally located outside of the computer 911. Linked through bus 956 can be a user input interface 957 adapted to connect to a display device 948, wherein the display device 948 can include a computer monitor, camera, television, projector, or mobile device, among others. A printer interface 959 can also be connected through bus 956 and adapted to connect to a printing device 932, wherein the printing device 932 can include a liquid inkjet printer, solid ink printer, large-scale commercial printer, thermal printer, UV printer, or dye-sublimation printer, among others. A network interface controller (NIC) 934 is adapted to connect through the bus 956 to a network 936, wherein image data or other data, among other things, can be rendered on a third party display device, third party imaging device, and/or third party printing device outside of the computer 911. The computer/processor 911 can include a GPS 901 connected to bus 956. Further, Still referring to FIG. 9, the image data or other data, among other things, can be transmitted over a communication channel of the network 936, and/or stored within the storage system 958 for storage and/or further processing. Further, the time series data or other data may be received wirelessly or hard wired from a receiver 946 (or external receiver 938) or transmitted via a transmitter 947 (or external transmitter 939) wirelessly or hard wired, the receiver 946 and transmitter 947 are both connected through the bus 956. The computer 911 may be connected via an input interface 908 to external sensing devices 944 and external input/output devices 941. The input interface 908 can be connected to one or more input/output devices 941, external memory 906, external sensors 904, which may be connected to a machine like device 902. A controller(s) 942 can be connected to device(s) 943. Further, other computer(s) 945 can be connected to the bus 956). For example, the external sensing devices 944 may include sensors gathering data before-during-after of the collected time-series data of the machine. The computer 911 may be connected to other external computers 942. An output interface 909 may be used to output the processed data from the processor 940. It is noted that a user interface 949 in communication with the processor 940 and the non-transitory computer readable storage medium 912, acquires and stores the region data in the non-transitory computer readable storage medium 912 upon receiving an input from a surface 952 of the user interface 949 by a user. Further, a controller 961 can be connected to the bus 956, to control devices associated with the embodiments of the systems and methods of the present disclosure.

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

In addition, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, with machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as first, second, in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A computer-implemented method for multiple image registration of images a scene or an object, comprising:
   receiving image data of the scene or the object, the image data includes images collected from different measurements of a single modality or multiple modalities, either at different rotation angles, horizontal shifts, or vertical shifts, of the scene;
   estimating registration parameters, through an image processor, using pairs of images from the received image data, wherein each pair of images includes a reference image and a floating image;
   generating parameter matrices corresponding to registration parameters including an image rotation angle matrix, an image horizontal shift matrix and an image vertical shift matrix, using an image registration process for all pairs of images;
   decomposing each parameter matrix into a low-rank matrix of updated registration parameters and a sparse matrix corresponding to the registration parameter errors for each low-rank matrix, to obtain updated registration parameters for robust registration; and
   using the updated registration parameters to form a transformation matrix to register the images of the image data with at least one reference image, resulting in robust registration of the images.

2. The computer-implemented method of claim 1, wherein the image registration process is one of a mutual information (MI) process, a cross-correlation process or a feature-based process.

3. The computer-implemented method of claim 1, wherein each pair of images correspond to the registration parameter between the floating image and the reference image.

4. The computer-implemented method of claim 1, wherein the image data includes a single modality or different modalities, including one or a combination of multi-spectral (MS) images, panchromatic (PAN) images, color images, of the scene.

5. The computer-implemented method of claim 1, wherein the image data includes different modalities, including one of CT images or MRI images, or both, of the object.

6. The computer-implemented method of claim 1, wherein the image data includes radar images of the scene.

7. The computer-implemented method of claim 1, wherein the parameter matrices are generated in parallel by the imaging processor, resulting in a less computational time, when compared to a total computation time of generating each parameter matrix of the parameter matrices separately.

8. The computer-implemented method of claim 1, wherein the low-rank matrix of updated registration parameters is imposed with a strict rank ≤2 structure on the low-rank matrix.

9. The computer-implemented method of claim 1, wherein the registering of the images using the updated registration parameters to form the transformation matrix continues until a predetermined convergence threshold is met, such that the registering ends, resulting in the robust registration of the images.

10. The computer-implemented method of claim 9, wherein the predetermined convergence threshold is a positive number.

11. The computer-implemented method of claim 1, further comprising:
    receiving the image data via a transceiver; and
    storing the image data in a memory, wherein the memory and the transceiver are in communication with the image processor, such that previously stored in the memory is data, the data includes image historical data of the scene, image historical data of the object, or image historical data of both the scene and the object, the image registration process, along with stored instructions executable by the image processor.

12. A system for multiple image registration of images of a scene or an object, comprising:
    a transceiver for receiving image data of the scene or the object, the image data includes images collected from different measurements of a single modality or multiple modalities, either at different rotation angles, horizontal shifts, or vertical shifts, of the scene;
    an image processor in communication with the transceiver, is configured to
      estimate registration parameters, including an image rotation angle, an image horizontal shift and an image vertical shift, using pairs of images from the received image data, wherein each pair of images includes a reference image and a floating image;
      generating parameter matrices corresponding to registration parameters including an image rotation angle matrix, an image horizontal shift matrix and an image vertical shift matrix, using an image registration process for all pairs of images;
      decompose each parameter matrix into a low-rank matrix of updated registration parameters and a sparse matrix corresponding to the registration parameter errors for each low-rank matrix, to obtain updated registration parameters for robust registration;
      use the updated registration parameters to form a transformation matrix to register the images of the image data with at least one reference image, resulting in robust registration of the images; and
      display the robust registered images on a display device, a user reviews the displayed robust registered images, and based upon the users review, the user conducts an image management action.

13. The system of claim 12, wherein the image registration process is one of a mutual information (MI) process, a cross-correlation process or a feature-based process.

14. The system of claim 12, wherein the image data includes one or combination of multispectral (MS) images, panchromatic (PAN) images, color images, CT images, MRI images or radar images.

15. The system of claim 12, wherein the low-rank matrix of updated registration parameters for the image rotation angle matrix is imposed with a strict rank ≤2 structure on the low-rank matrix.

16. A non-transitory computer readable storage medium embodied thereon a program executable by a computer for performing a method, the method is for image processing of images of a scene or an object, comprising:
- acquiring image data of the scene or the object, the image data includes images collected from different measurements of a single modality or multiple modalities, either at different rotation angles, horizontal shifts, or vertical shifts, of the scene;
- estimating registration parameters, through the computer, using pairs of images from the acquired image data, wherein each pair of images includes a reference image and a floating image;
- generating parameter matrices corresponding to registration parameters including an image rotation angle matrix, an image horizontal shift matrix and an image vertical shift matrix, using an image registration process for all pairs of images, wherein each entry of each matrix corresponds to a registration parameter between the floating image and the reference image pair;
- decomposing each parameter matrix into a low-rank matrix of updated registration parameters and a sparse matrix corresponding to the registration parameter errors for each low-rank matrix, to obtain updated registration parameters for robust registration; and
- using the updated registration parameters to form a transformation matrix to register the images of the image data with at least one reference image, resulting in robust registration of the images.

17. The non-transitory computer readable storage medium of claim 16, wherein the image registration process is one of a mutual information (MI) process, a cross-correlation process or a feature-based process.

18. The non-transitory computer readable storage medium of claim 16, wherein the low-rank matrix of updated registration parameters for the image rotation angle matrix is imposed with a strict rank ≤2 structure on the low-rank matrix.

19. The non-transitory computer readable storage medium of claim 16, further comprising:
- using an input interface to acquire the image data; and
- storing the image data in an image database of the storage medium, wherein the storage medium also includes an image processing database having previously stored data, the data includes image historical data of the scene, image historical data of the object, or both the image historical data of the scene and the object, the image registration process, along with stored instructions executable by the computer,
- wherein an amount of stored image data in the image database is larger than all amounts of data in the image processing database, such that the storage medium requires a lesser amount of computer processing time for operating the method due to processing less data by separately accessing the image processing database, when compared to accessing data from a combined databased including all data from the image database and data from the imaging processing database.

* * * * *